United States Patent
Agapi et al.

(10) Patent No.: US 9,349,367 B2
(45) Date of Patent: May 24, 2016

(54) RECORDS DISAMBIGUATION IN A MULTIMODAL APPLICATION OPERATING ON A MULTIMODAL DEVICE

(75) Inventors: Ciprian Agapi, Lake Worth, FL (US); William K. Bodin, Austin, TX (US); Charles W. Cross, Jr., Wellington, FL (US); Pradeep P. Mansey, Coral Springs, FL (US)

(73) Assignee: Nuance Communications, Inc., Burlington, MA (US)

(*) Notice: Subject to any disclaimer, the term of this patent is extended or adjusted under 35 U.S.C. 154(b) by 1673 days.

(21) Appl. No.: 12/109,167

(22) Filed: Apr. 24, 2008

(65) Prior Publication Data

US 2009/0271199 A1 Oct. 29, 2009

(51) Int. Cl.
| | |
|---|---|
| *G10L 15/00* | (2013.01) |
| *G10L 15/08* | (2006.01) |
| *G10L 15/183* | (2013.01) |
| *G10L 15/22* | (2006.01) |

(52) U.S. Cl.
CPC ............ *G10L 15/22* (2013.01); *G10L 15/00* (2013.01); *G10L 15/08* (2013.01); *G10L 15/183* (2013.01)

(58) Field of Classification Search
USPC .......................... 704/10, 231–257, 270–271, 704/E15.001–E15.05; 348/14.01–14.16, 348/61–161; 379/67.1–88.28, 419–440
See application file for complete search history.

(56) References Cited

U.S. PATENT DOCUMENTS

| | | | | |
|---|---|---|---|---|
| 4,488,005 A | * | 12/1984 | Frantz | ........................ 379/88.04 |
| 5,577,165 A | | 11/1996 | Takebayashi et al. | |

(Continued)

FOREIGN PATENT DOCUMENTS

| | | |
|---|---|---|
| CN | 1385783 | 12/2002 |
| CN | 1385783 A | 12/2002 |

(Continued)

OTHER PUBLICATIONS

"Voice Extensible Markup Language (VoiceXML) Version 2.0." World Wide Web Consortium (W3C). W3C Recommendation Mar. 16, 2004. <http://www.w3.org/TR/2004/REC-voicexml20-20040316/> Accessed May 9, 2011.*

(Continued)

*Primary Examiner* — Pierre-Louis Desir
*Assistant Examiner* — David Kovacek
(74) *Attorney, Agent, or Firm* — Wolf, Greefield & Sacks, P.C.

(57) ABSTRACT

Methods, apparatus, and products are disclosed for record disambiguation in a multimodal application operating on a multimodal device, the multimodal device supporting multiple modes of interaction including at least a voice mode and a visual mode, that include: prompting, by the multimodal application, a user to identify a particular record among a plurality of records; receiving, by the multimodal application in response to the prompt, a voice utterance from the user; determining, by the multimodal application, that the voice utterance ambiguously identifies more than one of the plurality of records; generating, by the multimodal application, a user interaction to disambiguate the records ambiguously identified by the voice utterance in dependence upon record attributes of the records ambiguously identified by the voice utterance; and selecting, by the multimodal application for further processing, one of the records ambiguously identified by the voice utterance in dependence upon the user interaction.

20 Claims, 9 Drawing Sheets

(56) References Cited

U.S. PATENT DOCUMENTS

| | | |
|---|---|---|
| 5,584,052 A | 12/1996 | Galau et al. |
| 5,729,694 A * | 3/1998 | Holzrichter et al. ............ 705/17 |
| 5,918,222 A * | 6/1999 | Fukui et al. |
| 5,969,717 A | 10/1999 | Ikemoto |
| 6,006,175 A * | 12/1999 | Holzrichter .................. 704/208 |
| 6,208,972 B1 | 3/2001 | Grant et al. |
| 6,243,375 B1 | 6/2001 | Speicher |
| 6,275,806 B1 | 8/2001 | Pertrushin |
| 6,301,560 B1 | 10/2001 | Masters |
| 6,513,011 B1 | 1/2003 | Uwakubo |
| 6,606,599 B2 | 8/2003 | Grant et al. |
| 6,856,960 B1 | 2/2005 | Dragosh et al. |
| 6,920,425 B1 | 7/2005 | Will et al. |
| 6,963,837 B1 * | 11/2005 | Finke et al. .................. 704/256 |
| 6,999,930 B1 | 2/2006 | Roberts et al. |
| 7,035,805 B1 | 4/2006 | Miller |
| 7,150,399 B2 | 12/2006 | Barrus et al. |
| 7,171,243 B2 | 1/2007 | Watanabe et al. |
| 7,174,288 B2 * | 2/2007 | Ju et al. ............... 704/2 |
| 7,188,067 B2 | 3/2007 | Grant et al. |
| 7,260,535 B2 * | 8/2007 | Galanes ............ H04M 3/42204 704/270 |
| 7,330,890 B1 | 2/2008 | Partovi et al. |
| 7,376,586 B1 | 5/2008 | Partovi et al. |
| 7,487,085 B2 | 3/2009 | Cross |
| 7,920,681 B2 * | 4/2011 | Agapi et al. ............... 379/88.16 |
| 2002/0065944 A1 | 5/2002 | Hickey et al. |
| 2002/0069058 A1 * | 6/2002 | Jin et al. .................. 704/249 |
| 2002/0092019 A1 | 7/2002 | Marcus |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0101451 A1 | 5/2003 | Bentolila et al. |
| 2003/0125945 A1 | 7/2003 | Doyle |
| 2003/0171926 A1 * | 9/2003 | Suresh et al. .............. 704/270.1 |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0006474 A1 * | 1/2004 | Gong et al. ................. 704/270.1 |
| 2004/0019487 A1 | 1/2004 | Kleindienst et al. |
| 2004/0025115 A1 | 2/2004 | Sienel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0138890 A1 | 7/2004 | Ferrans et al. |
| 2004/0153323 A1 | 8/2004 | Charney et al. |
| 2004/0179038 A1 | 9/2004 | Blattner et al. |
| 2004/0216036 A1 | 10/2004 | Chu et al. |
| 2004/0236574 A1 | 11/2004 | Ativanichayaphong |
| 2004/0260562 A1 | 12/2004 | Kujirai |
| 2005/0075884 A1 | 4/2005 | Badt, Jr. |
| 2005/0091059 A1 | 4/2005 | Lecoeuche |
| 2005/0131701 A1 | 6/2005 | Cross |
| 2005/0138219 A1 | 6/2005 | Boughannam |
| 2005/0138647 A1 | 6/2005 | Boughannam |
| 2005/0154580 A1 | 7/2005 | Horowitz et al. |
| 2005/0160461 A1 | 7/2005 | Baumgartner et al. |
| 2005/0188412 A1 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0273769 A1 | 12/2005 | Eichenberger |
| 2005/0283364 A1 * | 12/2005 | Longe et al. .................. 704/257 |
| 2005/0283367 A1 | 12/2005 | Cross |
| 2006/0047510 A1 | 3/2006 | Cross |
| 2006/0064302 A1 | 3/2006 | Cross |
| 2006/0069564 A1 | 3/2006 | Allison et al. |
| 2006/0074680 A1 | 4/2006 | Cross |
| 2006/0075120 A1 | 4/2006 | Smit |
| 2006/0111906 A1 | 5/2006 | Cross |
| 2006/0122836 A1 | 6/2006 | Cross |
| 2006/0123358 A1 | 6/2006 | Lee et al. |
| 2006/0136220 A1 * | 6/2006 | Gurram ................ G10L 15/005 704/275 |
| 2006/0136222 A1 | 6/2006 | Cross |
| 2006/0143007 A1 * | 6/2006 | Koh et al. ..................... 704/243 |
| 2006/0146728 A1 | 7/2006 | Engelsma et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0277030 A1 * | 12/2006 | Bedworth ........... G06F 17/2735 704/4 |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2006/0290709 A1 * | 12/2006 | Omi et al. ..................... 345/594 |
| 2007/0156405 A1 * | 7/2007 | Schulz .................... G10L 13/08 704/255 |
| 2007/0265851 A1 | 11/2007 | Cross et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0071544 A1 * | 3/2008 | Beaufays et al. .......... 704/270.1 |
| 2008/0075244 A1 * | 3/2008 | Hale ................. H04M 3/42221 379/88.13 |
| 2008/0086564 A1 | 4/2008 | Putman et al. |
| 2008/0091412 A1 * | 4/2008 | Strope ..................... G10L 15/26 704/10 |
| 2008/0140410 A1 | 6/2008 | Cross et al. |
| 2008/0162136 A1 | 7/2008 | Ativanichayaphong et al. |
| 2008/0162143 A1 * | 7/2008 | Agapi et al. .................. 704/275 |
| 2008/0177530 A1 | 7/2008 | Cross et al. |
| 2008/0195393 A1 | 8/2008 | Cross et al. |
| 2008/0208584 A1 | 8/2008 | Cross et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Cross et al. |
| 2008/0208588 A1 | 8/2008 | Cross et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross et al. |
| 2008/0228495 A1 | 9/2008 | Cross et al. |
| 2008/0235021 A1 | 9/2008 | Cross et al. |
| 2008/0235022 A1 | 9/2008 | Cross et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Cross et al. |
| 2009/0006345 A1 * | 1/2009 | Platt et al. ......................... 707/4 |
| 2009/0271199 A1 * | 10/2009 | Agapi et al. ................... 704/251 |
| 2010/0332234 A1 * | 12/2010 | Agapi et al. ................... 704/275 |

FOREIGN PATENT DOCUMENTS

| | | |
|---|---|---|
| CN | 1564123 A | 1/2005 |
| EP | 0794670 A | 9/1997 |
| EP | 1450350 | 8/2004 |

(56) References Cited

FOREIGN PATENT DOCUMENTS

| | | |
|---|---|---|
| GB | 0507148.5 | 4/2005 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

"Homophone." YourDictionary.com definition: Nov. 11, 2007. Accessed via Internet Archive Nov. 13, 2011. <http://web.archive.org/web/20071111032751/http://www.yourdictionary.com/homophone>.*

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al.,Robust Semantic Confidence Scoring ICSLP 2002: 7$^{th}$ International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/919,005, Dec. 2005, Eichenberger, et al.
U.S. Appl. No. 12/109,151, Apr. 2008, Agapi, et al.
U.S. Appl. No. 12/109,167, Apr. 2008, Agapi, et al.
U.S. Appl. No. 12/109,204, Apr. 2008, Agapi, et al.
U.S. Appl. No. 12/109,227, Apr. 2008, Agapi, et al.
U.S. Appl. No. 12/109,214, Apr. 2008, Agapi, et al.

* cited by examiner

RECORDS DISAMBIGUATION IN A MULTIMODAL APPLICATION OPERATING ON A MULTIMODAL DEVICE

BACKGROUND OF THE INVENTION

1. Field of the Invention

The field of the invention is data processing, or, more specifically, methods, apparatus, and products for record disambiguation in a multimodal application operating on a multimodal device.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current multimodal applications support a voice mode of user interaction using a speech engine. A speech engine provides recognition and generation or 'synthesis' of human speech though use of an acoustic model that associates speech waveform data representing recorded pronunciations of speech with textual representations of those pronunciations, also referred to as 'phonemes.' Because most languages include sets of words that have the same pronunciation but have different spellings to distinguish each word's semantics, a set of phonemes representing a pronunciation may refer to more than one word in the language. A set of words having the same pronunciation, regardless of the words' semantics, are referred to as a 'homophonic set.' When a voice utterance specifying a word in a homophonic set is provided to the speech engine for recognition, therefore, the speech engine may return any one or all of the words in the homophonic set, but not necessarily the word intended by the speaker of the voice utterance.

In many multimodal applications, the multimodal application retrieves information for dynamic rendering from a database or other data repository. For example, the multimodal application may retrieve contact information for a user from the user's contact database. In such a database or other data repository, values for a particular attribute for multiple records may belong to the same homophonic set. When such an attribute is utilized as the key to select information from a data repository, the multimodal application cannot disambiguate between records to select the record desired by the user.

SUMMARY OF THE INVENTION

Methods, apparatus, and products are disclosed for record disambiguation in a multimodal application operating on a multimodal device, the multimodal device supporting multiple modes of interaction including at least a voice mode and a visual mode, that include: prompting, by the multimodal application, a user to identify a particular record among a plurality of records; receiving, by the multimodal application in response to the prompt, a voice utterance from the user; determining, by the multimodal application, that the voice utterance ambiguously identifies more than one of the plurality of records; generating, by the multimodal application, a user interaction to disambiguate the records ambiguously identified by the voice utterance in dependence upon record attributes of the records ambiguously identified by the voice utterance; and selecting, by the multimodal application for further processing, one of the records ambiguously identified by the voice utterance in dependence upon the user interaction.

The foregoing and other objects, features and advantages of the invention will be apparent from the following more particular descriptions of exemplary embodiments of the

DETAILED DESCRIPTION OF EXEMPLARY EMBODIMENTS

Figure 1:
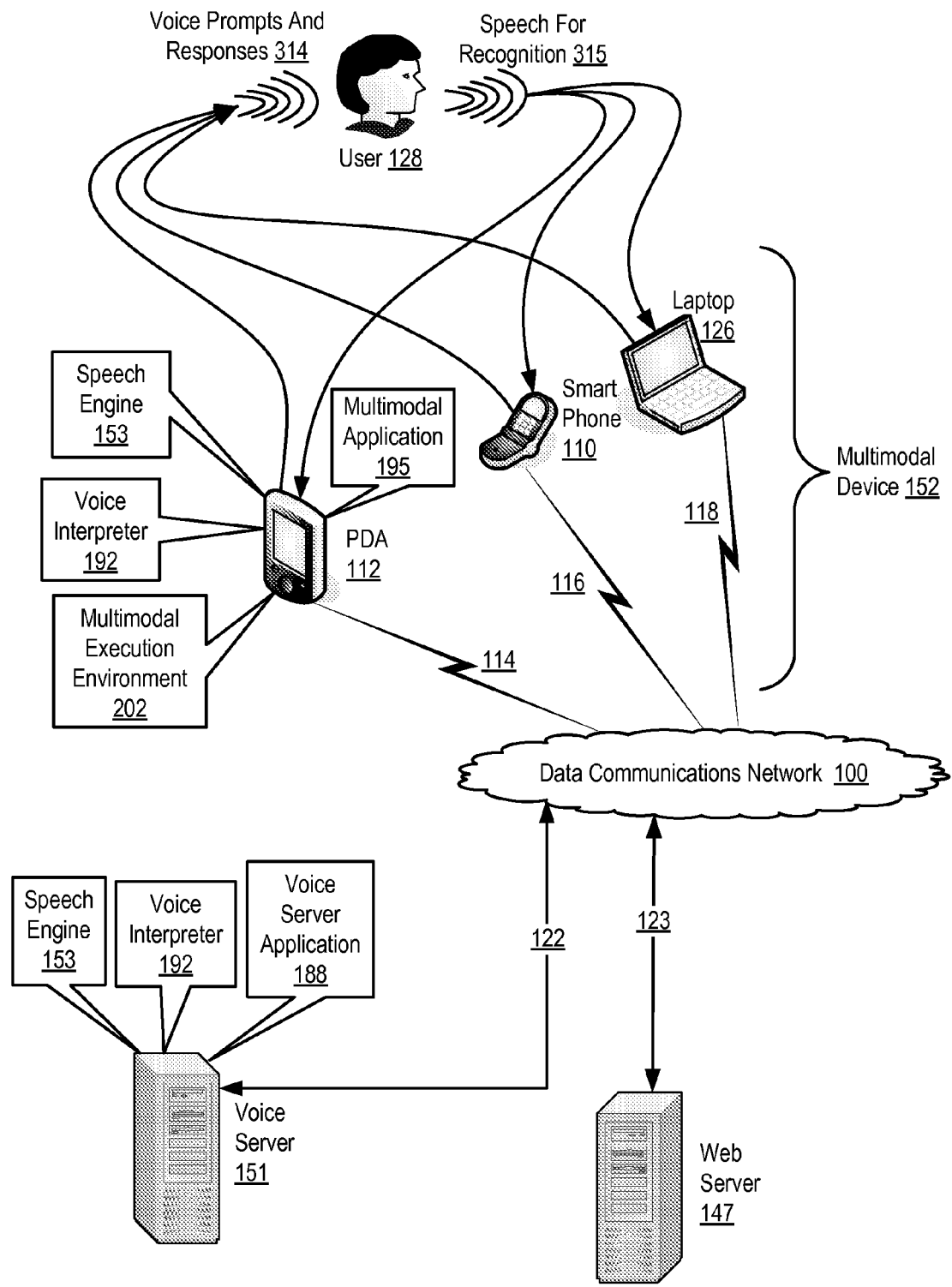
FIG. 1 sets forth a network diagram illustrating an exemplary system for record disambiguation in a multimodal application operating on a multimodal device according to embodiments of the present invention.

Exemplary methods, apparatus, and products for record disambiguation in a multimodal application operating on a multimodal device according to embodiments of the present invention are described with reference to the accompanying drawings, beginning with FIG. 1. FIG. 1 sets forth a network diagram illustrating an exemplary system for record disambiguation in a multimodal application (195) operating on a multimodal device (152) according to embodiments of the present invention. The multimodal application (195) is a software component that supports user interaction in both a voice mode and visual mode, and optionally various other modes such as, for example, tactile modes. The multimodal application (195) may include computer program instructions implemented in machine code that may be scheduled for execution directly by an operating system on a processor of the multimodal device (152). For example, the multimodal application (195) may be implemented as a compiled version of program written in C++.

In other embodiments, the multimodal application (195) may include computer program instructions implemented in a higher level, non-machine language that requires runtime translation into machine code. In such embodiments, the multimodal application (195) is supported as by a multimodal execution environment (202). The multimodal execution environment (202) may support execution of the multimodal application (195) by processing the multimodal application (195) itself or coordinating with other components such as, for example, a voice interpreter (192) to process portions of the multimodal application (195). The multimodal execution environment (202) may translate the multimodal application (195) into platform specific, machine code directly executable on the processors of the multimodal device (152), perform memory management for the multimodal application (195) during execution, control access to platform hardware, and so on. The implementation of the multimodal execution environment (202) typically depends on the implementation of the multimodal application (195). When the multimodal application (195) is implemented using X+V or SALT tags, then the multimodal execution environment may be implemented as a multimodal browser. When the multimodal application (195) is implemented using Java, then the multimodal execution environment may be implemented as a Java Virtual Machine. Readers will note that the implementations described above are for explanation only and not for limitation.

The multimodal device (152) of FIG. 1 supports multiple modes of user interaction with the multimodal application (195) including a voice mode and a visual mode, and optionally one or more other modes of user interaction with the multimodal application (195). The voice mode is represented here with audio output of voice prompts and responses (314) from the multimodal devices (152) and audio input of speech for recognition (315) from a user (128). Non-voice modes are represented by input/output devices such as keyboards and display screens on the multimodal devices (152). The voice mode of user interaction with the multimodal application is supported by a voice interpreter (192), through which the multimodal application (195) is operatively coupled to a speech engine (153). The operative coupling may be implemented with an application programming interface ('API'), a voice service module, or a VoIP connection as explained in more detail below.

In the exemplary system of FIG. 1, the voice interpreter (192) supports the voice mode of user interaction with the multimodal application (195) by providing grammars, speech for recognition, and text prompts for speech synthesis to the speech engine (153), and by returning to the multimodal application (195) speech engine output in the form of recognized speech, semantic interpretation results, and digitized speech for voice prompts. The implementation of the voice interpreter (192) typically depends on the technology implementing the multimodal application (195). The voice interpreter (192) of FIG. 1 may be implemented as a VoiceXML interpreter when the multimodal application (195) implements X+V. A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA'). When the multimodal application (195) is implemented according to SALT, the voice interpreter (192) may be implemented as a SALT interpreter. When the multimodal application (195) is implemented using Java, the voice interpreter (192) may be implemented using a VoiceXML interpreter that exposes a Java interface.

The multimodal application (195) of FIG. 1 includes a set of computer program instructions for record disambiguation according to embodiments of the present invention. The multimodal application (195) operates generally for record disambiguation according to embodiments of the present invention by: prompting a user to identify a particular record among a plurality of records; receiving, in response to the prompt, a voice utterance from the user (128); determining that the voice utterance ambiguously identifies more than one of the plurality of records; generating a user interaction to disambiguate the records ambiguously identified by the voice utterance in dependence upon record attributes of the records ambiguously identified by the voice utterance; and selecting, for further processing, one of the records ambiguously identified by the voice utterance in dependence upon the user interaction.

A voice utterance represents a speech waveform spoken by a user. When the voice utterance specifies a word or phrase in a homophonic set, the multimodal application (195) is generally not capable of distinguishing which word in the homophonic set the user intended to reference with the voice utterance. Accordingly, when that voice utterance is used to identify records in a database, the multimodal application (195) ambiguously identifies more than one record based on the voice utterance. The multimodal application (195) operating according to embodiments of the present invention then further interacts with the user (128) to disambiguate the records ambiguously identified based on the voice utterance.

Each multimodal device (152) of FIG. 1 is an automated device, that is, automated computing machinery or a computer program running on an automated device, that is capable of accepting from users more than one mode of input, keyboard, mouse, stylus, and so on, including speech input—and also rendering more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice-enabled browser on a smart phone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:
personal digital assistant ('PDA') (112) which is coupled for data communications to data communications network (100) through wireless connection (114),
smart phone (110) which is coupled for data communications to data communications network (100) through wireless connection (116), and
laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for record disambiguation in a multimodal application operating on a multimodal device according to embodiments of the present invention may be encoded with any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

As mentioned, a multimodal device according to embodiments of the present invention is capable of providing speech for recognition to a speech engine (153). A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (153) may be installed locally in the multimodal device (152) itself, or a speech engine (153) may be installed remotely with respect to the multimodal device, across a data communications network (100) in a voice server (151). A multimodal device that itself contains its own speech engine is said to implement a 'thick client' or 'thick client,' because the thick client itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin client' because the thin client itself contains only a relatively thin layer of application software that obtains speech recognition and speech synthesis services from a voice server located remotely across a network from the thin client. For ease of explanation, only one (112) of the multimodal devices (152) in the system of FIG. 1 is shown with a speech engine (153), but readers will recognize that any multimodal device may have a speech engine according to embodiments of the present invention.

As shown in FIG. 1, a speech engine (153) and a voice interpreter (192) may be installed locally in the multimodal device (112) itself, or a speech engine (153) and a voice interpreter (192) may be installed remotely with respect to the multimodal device, across a data communications network (100) in a voice server (151). In a thick client architecture, a multimodal device (152) includes both its own speech engine (153) and its own voice interpreter (192). The voice interpreter (192) exposes an API to the multimodal application (195) for use in providing speech recognition and speech synthesis for the multimodal application. The multimodal application provides, for example, dialog instructions, VoiceXML <form> elements, grammars, input elements, event handlers, and so on, through the API to the voice interpreter (192), and the voice interpreter (192) administers the speech engine on behalf of the multimodal application. In the thick client architecture, a multimodal application, including for example, VoiceXML dialogs, is interpreted by a voice interpreter on the multimodal device. In the thin client architecture, a multimodal application, including for example VoiceXML dialogs, is interpreted by a voice interpreter on a voice server (151) located remotely across a data communications network (100) from the multimodal device running the multimodal application (195).

In a thin client architecture, the speech engine (153) and the voice interpreter (192) are located remotely from the multimodal client device in a voice server (151), the API for the voice interpreter is still implemented in the multimodal device, with the API modified to communicate voice dialog instructions, speech for recognition, and text and voice prompts to and from the voice interpreter on the voice server. For ease of explanation, only one (112) of the multimodal devices (152) in the system of FIG. 1 is shown with a voice interpreter (192), but readers will recognize that any multimodal device may have a voice interpreter according to embodiments of the present invention.

The use of these three example multimodal devices (152) is for explanation only, not for limitation of the invention. Any automated computing machinery capable of accepting speech from a user, providing the speech digitized to a speech engine through a voice interpreter, and receiving and playing speech prompts and responses from the voice interpreter may be improved to function as a multimodal device for adjusting a speech engine based on background noise according to embodiments of the present invention.

The system of FIG. 1 also includes a voice server (151) which is connected to data communications network (100) through wireline connection (122). The voice server (151) is a computer that runs a speech engine (153). The voice server (151) provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for record disambiguation in a multimodal application operating on a multimodal device according to embodiments of the present invention is a data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol,
   a data communications network layer with the Internet Protocol ('IP'),
   a transport layer with the Transmission Control Protocol ('TCP') or the User Datagram Protocol ('UDP'),
   an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
   other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup documents that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (147) a markup document as part of a multimodal application, may execute speech elements by use of a voice interpreter (192) and speech engine (153) in the multimodal device itself or by use of a voice interpreter (192) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for record disambiguation in a multimodal application operating on a multimodal device according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Record disambiguation in a multimodal application operating on a multimodal device according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in record disambiguation in a multimodal application operating on a multimodal device according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured to carry out record disambiguation in a multimodal application operating on a multimodal device according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications.

Voice server application (188) may be implemented as a web server, implemented in Java, C++, or another language, that supports X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine and supports a Java voice framework by providing responses to HTTP requests from Java client applications running on multimodal devices. And voice server applications that support record disambiguation in a multimodal application operating on a multimodal device may be implemented in other ways as may occur to those of skill in the art, and all such ways are well within the scope of the present invention.

Also stored in RAM is a voice interpreter (192), a module of computer program instructions that supports the voice mode of user interaction with a multimodal application operating on a multimodal device. The voice interpreter (192) provides speech engine input such as grammars, speech for recognition, and text prompts for speech synthesis to the speech engine (153) and returns to the multimodal application speech engine output in the form of recognized speech, semantic interpretation results, and digitized speech for voice prompts. Input to voice interpreter (192) may originate, for example, from VoiceXML clients running remotely on multimodal devices, from X+V clients running remotely on multimodal devices, from SALT clients running on multimodal devices, or from Java client applications running remotely on multimodal devices. In this example, voice interpreter (192) interprets and executes VoiceXML segments representing voice dialog instructions received from remote multimodal devices and provided to voice interpreter (192) through voice server application (188).

When implemented in X+V, a multimodal application in a thin client architecture may provide voice dialog instructions, VoiceXML segments, VoiceXML <form> elements, and the like, to voice interpreter (149) through data communications across a network with the multimodal application. The voice dialog instructions include one or more grammars, data input elements, event handlers, and so on, that advise the voice interpreter how to administer voice input from a user and voice prompts and responses to be presented to a user. The voice interpreter (192) administers such dialogs by processing the dialog instructions sequentially in accordance with a VoiceXML Form Interpretation Algorithm ('FIA'). The voice interpreter (192) interprets VoiceXML dialogs provided to the voice interpreter (192) by a multimodal application.

To provide voice services to a multimodal application, the voice server (151) in this example includes a speech engine (153). The speech engine is a functional module, typically a software module, although it may include specialized hardware also, that does the work of recognizing and generating human speech. The speech engine (153) includes an automated speech recognition ('ASR') engine (150) for speech recognition and a text-to-speech ('TTS') engine (194) for generating speech. The speech engine also includes grammars (104), lexicons (106), and language-specific acoustic models (108). Each lexicon (106) and language-specific acoustic model (108) may be associated with a separate language in a configuration parameter repository (200).

The acoustic models (108) associate speech waveform data representing recorded pronunciations of speech with textual representations of those pronunciations, which are referred to as 'phonemes.' The speech waveform data may be implemented as a Speech Feature Vector ('SFV') that may be represented, for example, by the first twelve or thirteen Fourier or frequency domain components of a sample of digitized speech waveform. Accordingly, the acoustic models (108) may be implemented as data structures or tables in a database, for example, that associates these SFVs with phonemes representing, to the extent that it is practically feasible to do so, all pronunciations of all the words in various human languages, each language having a separate acoustic model (108). The lexicons (106) are associations of words in text form with phonemes representing pronunciations of each word; the lexicon effectively identifies words that are capable of recognition by an ASR engine. Each language has a separate lexicon (106). Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammars (104) communicate to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars for use in record disambiguation in a multimodal application operating on a multimodal device according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | artoush | tom;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush' or 'tom', and the <when> rule accepts 'today' or 'this afternoon' or 'tomorrow' or 'next week.' The command grammar as a whole matches utterances like these, for example:
    "phone bob next week,"
    "telephone martha this afternoon,"
    "remind me to call chris tomorrow," and
    "remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a SFV for the digitized word. The ASR engine can use the SFV to infer phonemes for the word from the language-specific acoustic model (108). The ASR engine then uses the phonemes to find the word in the lexicon (106).

Also stored in RAM (168) is an operating system (154). Operating systems useful in voice servers according to embodiments of the present invention include UNIX™, Linux™, Microsoft Vista™, IBM's AIX™, IBM's i5/OS™, and others as will occur to those of skill in the art. Operating system (154), voice server application (188), voice interpreter (192), speech engine (153), device location manager (120), device location repository (201), and configuration parameter repository (200) in the example of FIG. 2 are shown in RAM (168), but many components of such software typically are stored in non-volatile memory also, for example, on a disk drive (170).

Figure 2:
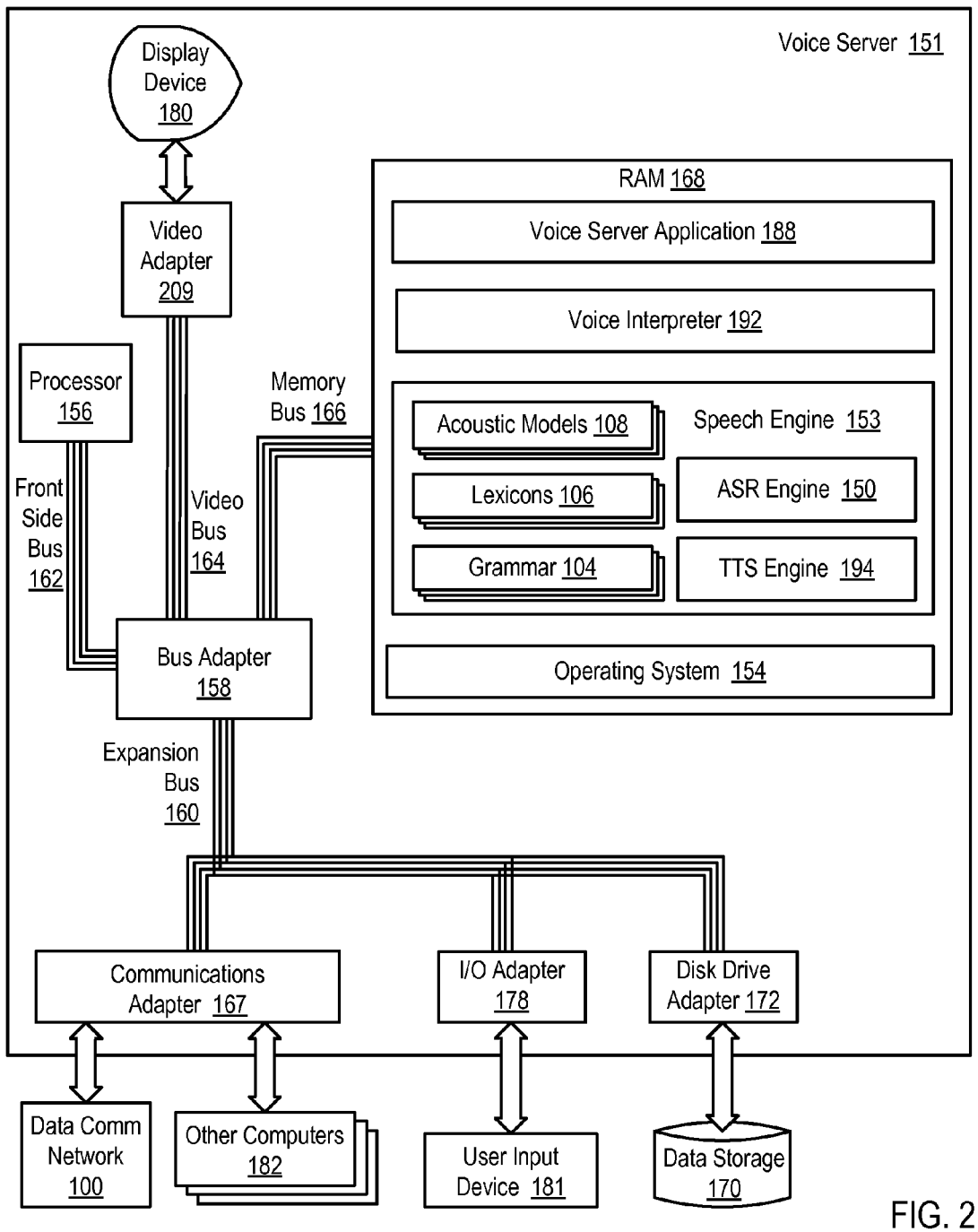
FIG. 2 sets forth a block diagram of automated computing machinery comprising an example of a computer useful as a voice server in record disambiguation in a multimodal application operating on a multimodal device according to embodiments of the present invention.

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Peripheral Component Interconnect ('PCI') and PCI-Extended ('PCI-X') bus, as well as PCI Express ('PCIe') point to point expansion architectures and others.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for record disambiguation in a multimodal application operating on a multimodal device according to embodiments of the present invention include modems for wired dial-up communications, Ethernet (IEEE 802.3) adapters for wired data communications network communications, and 802.11 adapters for wireless data communications network communications.

Figure 3:
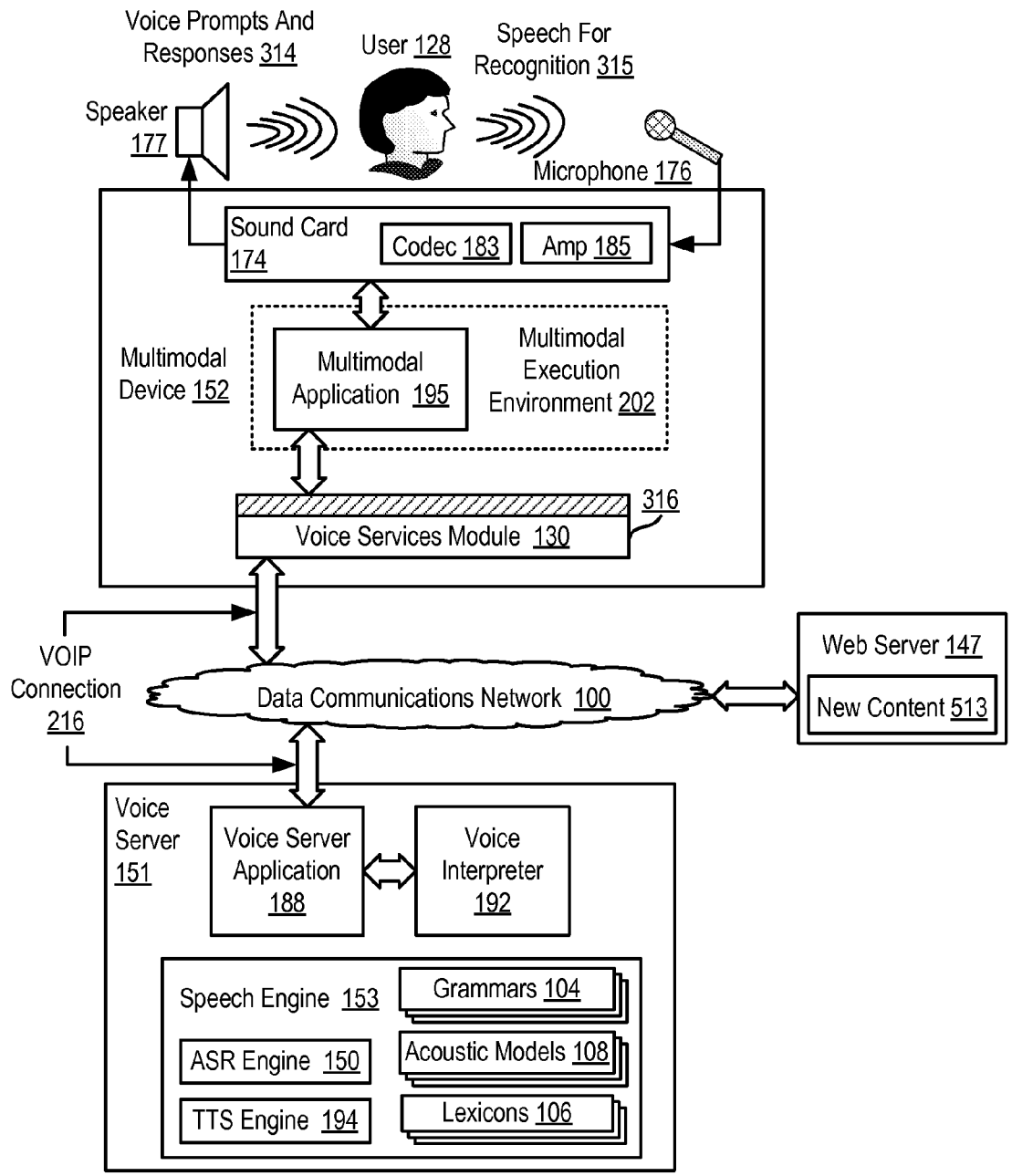
FIG. 3 sets forth a functional block diagram of exemplary apparatus for record disambiguation in a multimodal application operating on a multimodal device according to embodiments of the present invention.

For further explanation, FIG. 3 sets forth a functional block diagram of exemplary apparatus for record disambiguation in a multimodal application (195) operating on a multimodal device (152) in a thin client architecture according to embodiments of the present invention. The example multimodal device (152) of FIG. 3 includes a sound card (174), which is an example of an I/O adapter specially designed for accepting analog audio signals from a microphone (176) and converting the audio analog signals to digital form for further processing by a codec (183).

In some embodiments, the multimodal application (195) of FIG. 3 may include computer program instructions implemented in machine code that may be scheduled for execution directly by an operating system on a processor of the multimodal device (152). For example, the multimodal application (195) may be implemented as a compiled version of program written in C++. In some other embodiments in which the multimodal application (195) is implemented in higher level, non-machine language, a multimodal execution environment (202) may support the multimodal application (195) by translating the multimodal application (195) into platform specific, machine code directly executable on the processors of the multimodal device (152), performing memory management for the multimodal application (195) during execution, controlling access to platform hardware, and so on. The implementation of the multimodal execution environment (202) typically depends on the implementation of the multimodal application (195). When the multimodal application (195) is implemented using X+V or SALT tags, then the multimodal execution environment may be implemented as a multimodal browser. When the multimodal application (195) is implemented using Java, then the multimodal execution environment may be implemented as a Java Virtual Machine.

The multimodal application (195) of FIG. 3 includes a set of computer program instructions for record disambiguation according to embodiments of the present invention. The multimodal application (195) operates generally for record disambiguation according to embodiments of the present invention by: prompting a user to identify a particular record among a plurality of records; receiving, in response to the prompt, a voice utterance from the user (128); determining that the voice utterance ambiguously identifies more than one of the plurality of records; generating a user interaction to disambiguate the records ambiguously identified by the voice utterance in dependence upon record attributes of the records ambiguously identified by the voice utterance; and selecting, for further processing, one of the records ambiguously identified by the voice utterance in dependence upon the user interaction.

The example of FIG. 3 also includes a voice server (151) having installed upon it a voice server application (188), a voice interpreter (192), and a speech engine (153). The speech engine (153) includes an ASR engine (150), grammars (104), lexicons (106), acoustic models (108), and a TTS engine (194). The voice interpreter (192) of FIG. 3 is implemented as a VoiceXML interpreter that interprets and executes VoiceXML dialog instructions received from the multimodal application and provided to voice interpreter (192) through voice server application (188). VoiceXML input to the voice interpreter (192) may originate from the multimodal application (195) implemented as an X+V client running remotely on the multimodal device (152). As noted above, the multimodal application (195) also may be implemented as a Java client application running remotely on the multimedia device (152), a SALT application running remotely on the multimedia device (152), and in other ways as may occur to those of skill in the art.

In the example of FIG. 3, the voice server (151) connects to the multimodal device (152) for data communication by a VoIP connection (216) through a data communications network (100). VoIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VoIP' protocols. VoIP traffic may be deployed on any IP data communications network, including data communications networks lacking a connection to the rest of the Internet, for instance on a private building-wide local area data communications network or 'LAN.'

Many protocols are used to effect VoIP. The two most popular types of VoIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VoIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operate in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VoIP protocol, and transmits the speech to voice server (151) through the VoIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) supports text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to voice interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

The multimodal application (195) is operatively coupled to the speech engine (153). In this example, the operative coupling between the multimodal application (195) and the speech engine (153) is implemented with a VoIP connection (216) through a voice services module (130), then through the voice server application (188) and the voice interpreter (192). Depending on whether the multimodal application is implemented in X+V, Java, or SALT, the voice interpreter (192) may be implemented using a VoiceXML interpreter, a VoiceXML interpreter exposing a Java interface, a SALT interpreter, or any other implementation as will occur to those of skill in the art. The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal application (195) and the multimodal execution environment (202).

The voice services module (130) provides data communications services through the VoIP connection and the voice server application (188) between the multimodal device (152) and the voice interpreter (192). The API (316) of FIG. 3 may be the same API presented to applications by a voice interpreter when the voice interpreter is installed on the multimodal device in a thick client architecture. So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

Figure 4:
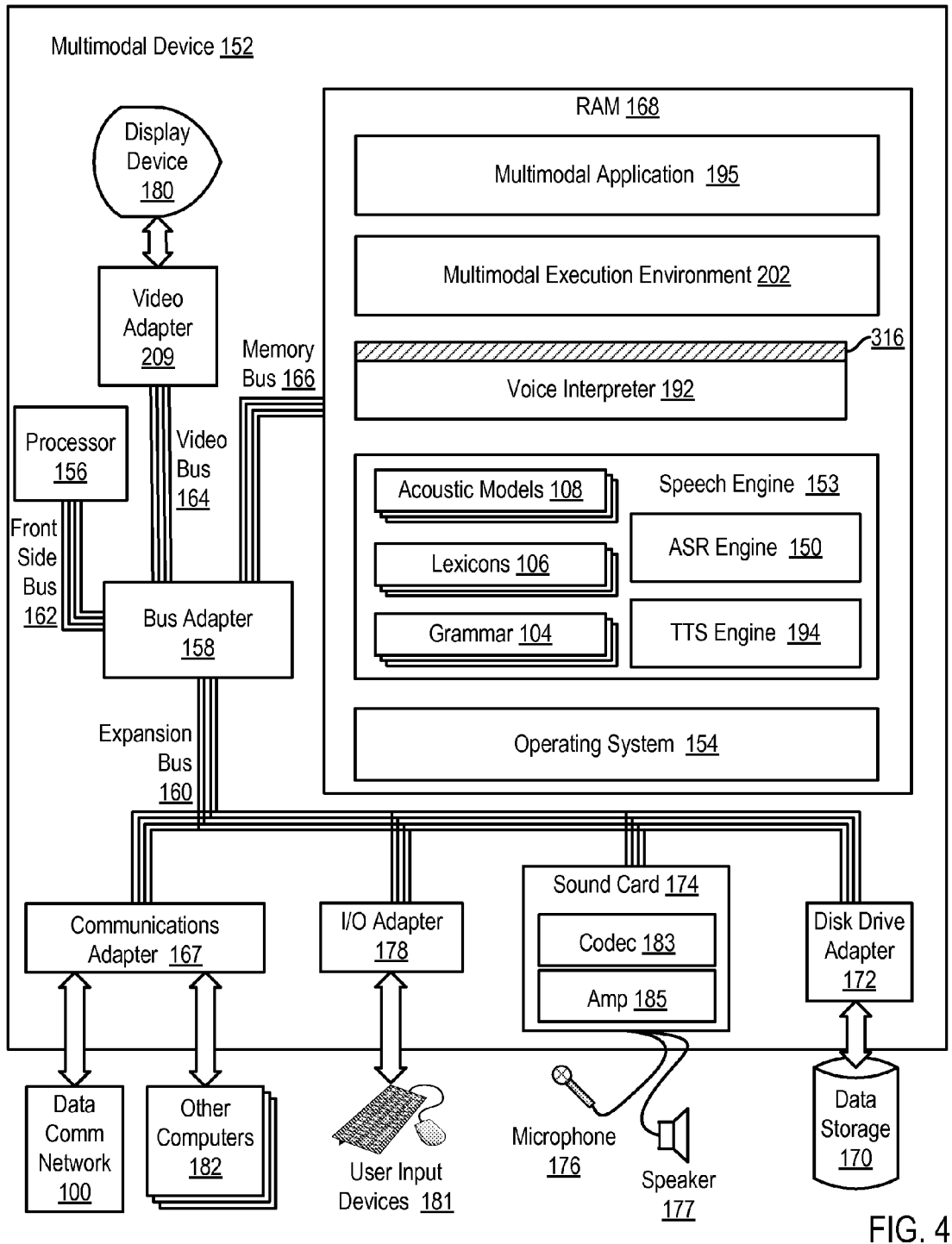
FIG. 4 sets forth a block diagram of automated computing machinery comprising an example of a computer useful as a multimodal device in record disambiguation in a multimodal application operating on a multimodal device according to embodiments of the present invention.

Record disambiguation in a multimodal application operating on a multimodal device according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in record disambiguation in a multimodal application (195) operating on the multimodal device (152) according to embodiments of the present invention. In a multimodal device implementing a thick client architecture as illustrated in FIG. 4, the multimodal device (152) has no connection to a remote voice server containing a voice interpreter and a speech engine. All the components needed for speech synthesis and voice recognition in record disambiguation in a multimodal application operating on a multimodal device according to embodiments of the present invention are installed or embedded in the multimodal device itself.

The example multimodal device (152) of FIG. 4 includes several components that are structured and operate similarly to the components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a voice interpreter (192), a speech engine (153), and so on. As in the system of FIG. 2, the speech engine (153) in the multimodal device of FIG. 4 includes an ASR engine (150), grammars (104), lexicons (106), acoustic models (108), and a TTS engine (194). The voice interpreter (192) may be implemented as a VoiceXML interpreter that administers dialogs by processing the dialog instructions sequentially in accordance with a VoiceXML Form Interpretation Algorithm ('FIA').

The speech engine (153) in this kind of embodiment, a thick client architecture, often is implemented as an embedded module in a small form factor device such as a handheld device, a mobile phone, PDA, and the like. An example of an embedded speech engine that may be improved for record disambiguation in a multimodal application operating on a multimodal device according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports multiple modes of user interaction, including a voice mode and one or more non-voice modes. The multimodal application (195) implements speech recognition by accepting speech for recognition from a user and sending the speech for recognition through API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal execution environment (202) implemented as a multimodal browser or microbrowser that passes VoiceXML grammars and digitized speech by calls through an API (316) directly to an embedded voice interpreter (192) for processing. The embedded voice interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In a further class of exemplary embodiments, the multimodal application (195) may be implemented as a Java voice application that executes in a multimodal execution environment (202) implemented as a Java Virtual Machine and issues calls through an API of the voice interpreter (192) for speech recognition and speech synthesis services. In further exemplary embodiments, the multimodal application (195) may be implemented as a set or sequence of SALT documents executed in a multimodal execution environment (202) implemented as a multimodal browser or microbrowser that issues calls through an API of the voice interpreter (192) for speech recognition and speech synthesis services. In addition to X+V, SALT, and Java implementations, multimodal application (195) may be implemented in other technologies as will occur to those of skill in the art, and all such implementations are well within the scope of the present invention.

The multimodal application (195) of FIG. 4 includes a set of computer program instructions for record disambiguation according to embodiments of the present invention. The multimodal application (195) operates generally for record disambiguation according to embodiments of the present invention by: prompting a user to identify a particular record among a plurality of records; receiving, in response to the prompt, a voice utterance from the user; determining that the voice utterance ambiguously identifies more than one of the plurality of records; generating a user interaction to disambiguate the records ambiguously identified by the voice utterance in dependence upon record attributes of the records ambiguously identified by the voice utterance; and selecting, for further processing, one of the records ambiguously identified by the voice utterance in dependence upon the user interaction.

The multimodal application (195) of FIG. 4 is operatively coupled to the speech engine (153). In this example, the operative coupling between the multimodal application and the speech engine (153) is implemented through the voice interpreter (192). Depending on whether the multimodal application is implemented in X+V, Java, or SALT, the voice interpreter (192) may be implemented as a VoiceXML interpreter, a VoiceXML interpreter exposing a Java interface, or SALT interpreter. When the multimodal application (195) is implemented in X+V, the operative coupling is effected through the multimodal execution environment (202), which provides an operating environment and an interpreter for the X+V application, and then through a VoiceXML interpreter, which passes grammars and voice utterances for recognition to the speech engine (153) through the voice interpreter (192). When the multimodal application (195) is implemented in Java Speech, the multimodal execution environment (202) is implemented as a Java Virtual Machine, which provides an operating environment for the Java application and the voice interpreter (192), which passes grammars and voice utterances for recognition to the speech engine (153). When the multimodal application (195) is implemented in SALT, the multimodal execution environment (202) is implemented as a multimodal browser, which provides an operating environment and an interpreter for the X+V application, and then through a SALT interpreter, which passes grammars and voice utterances for recognition to the speech engine (153).

The multimodal application (195) in this example, running on a multimodal device (152) that contains its own voice interpreter (192) and its own speech engine (153) with no network or VoIP connection to a remote voice server containing a remote VoiceXML interpreter or a remote speech engine, is an example of a so-called 'thick client architecture,' so-called because all of the functionality for processing voice mode interactions between a user and the multimodal application is implemented on the multimodal device itself.

Figure 5:
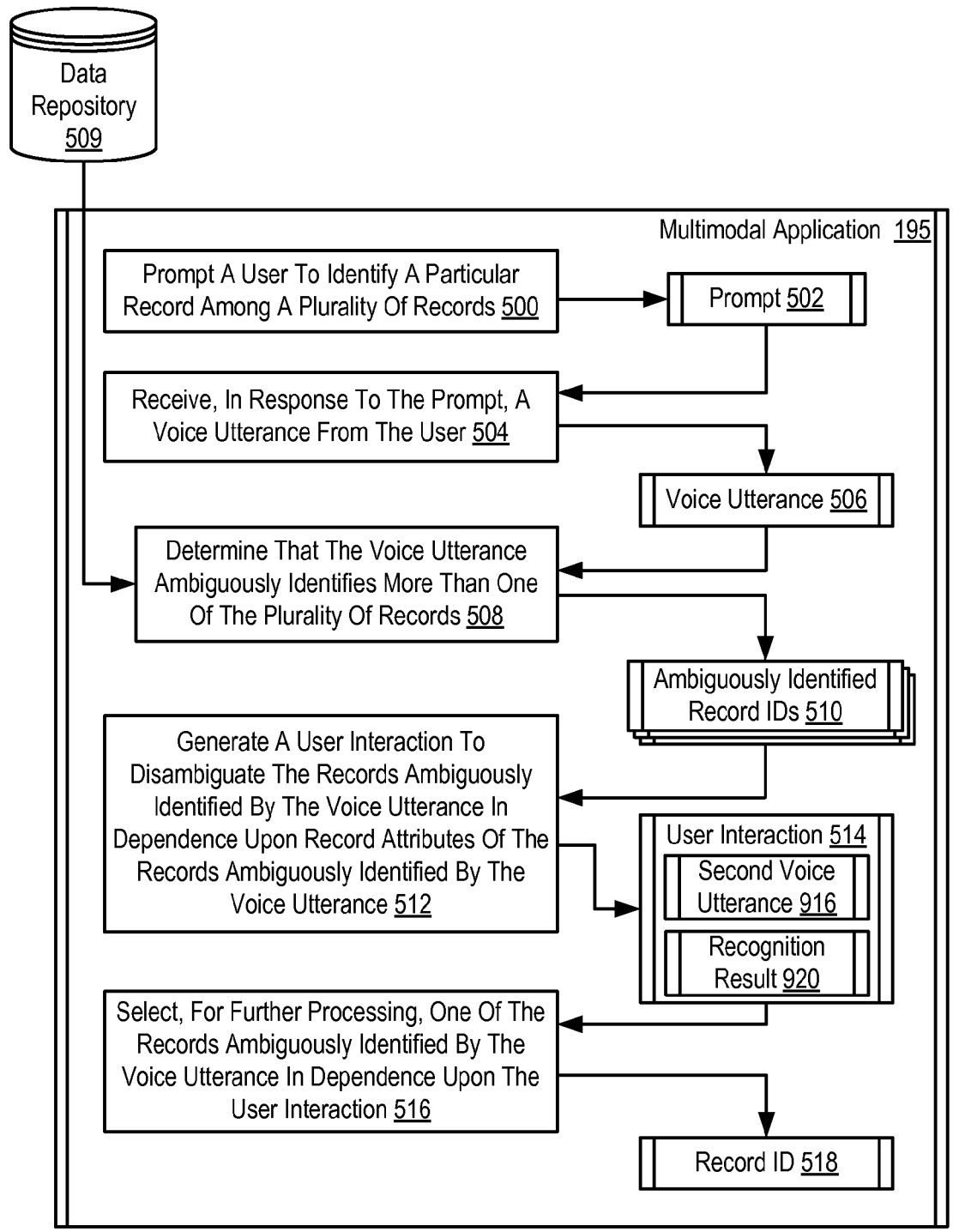
FIG. 5 sets forth a flow chart illustrating an exemplary method of record disambiguation in a multimodal application operating on a multimodal device according to embodiments of the present invention.

For further explanation, FIG. 5 sets forth a flow chart illustrating an exemplary method of record disambiguation in a multimodal application operating on a multimodal device according to embodiments of the present invention. The multimodal device described with reference to FIG. 5 supports multiple modes of interaction, including at least a voice mode and a visual mode. The voice mode of interaction may be implemented using speakers or a microphone of the multimodal device along with a sound card to provide an interface for the speakers or the microphone with the remaining components of the device. The visual mode of interaction may be implemented using a display for the multimodal device on which the device may render a graphical user interface ('GUI') along with a graphic card that provides an interface for the display with the other components of the multimodal device.

The method of FIG. 5 includes prompting (500), by the multimodal application (195), a user to identify a particular record among a plurality of records. The multimodal application (195) may request an identifier for a particular record among a plurality of records to further process that particular record. The type of further processing typically depends on the specific implementation of the multimodal application (195). For example, when the multimodal application is implemented as personal information management ('PIM') software, the multimodal application may request that the user identify a record representing the contact information for a particular individual among many other similar records so that the PIM can create a blank email to the particular individual into which the user can type. For another example, when the multimodal application is implemented as a personal finance application, the multimodal application may request that the user identify a record representing a particular financial transaction for display to the user.

The multimodal application (195) may prompt (500) a user to identify a particular record among a plurality of records according to the method of FIG. 5 by rendering a prompt (502) to the user through the voice mode or visual mode of user interaction. The prompt (502) of FIG. 5 represent information provided to the user that requests the user to providing information to the multimodal device through some user interaction. The multimodal application (195) may render the prompt through the voice mode by synthesizing text into speech using a TTS engine and playing the synthesized speech through a speaker for the multimodal device. The multimodal device may render the prompt (502) through the visual mode of user interaction by displaying text or graphics to the user using a GUI on the multimodal device's display.

Figure 6:
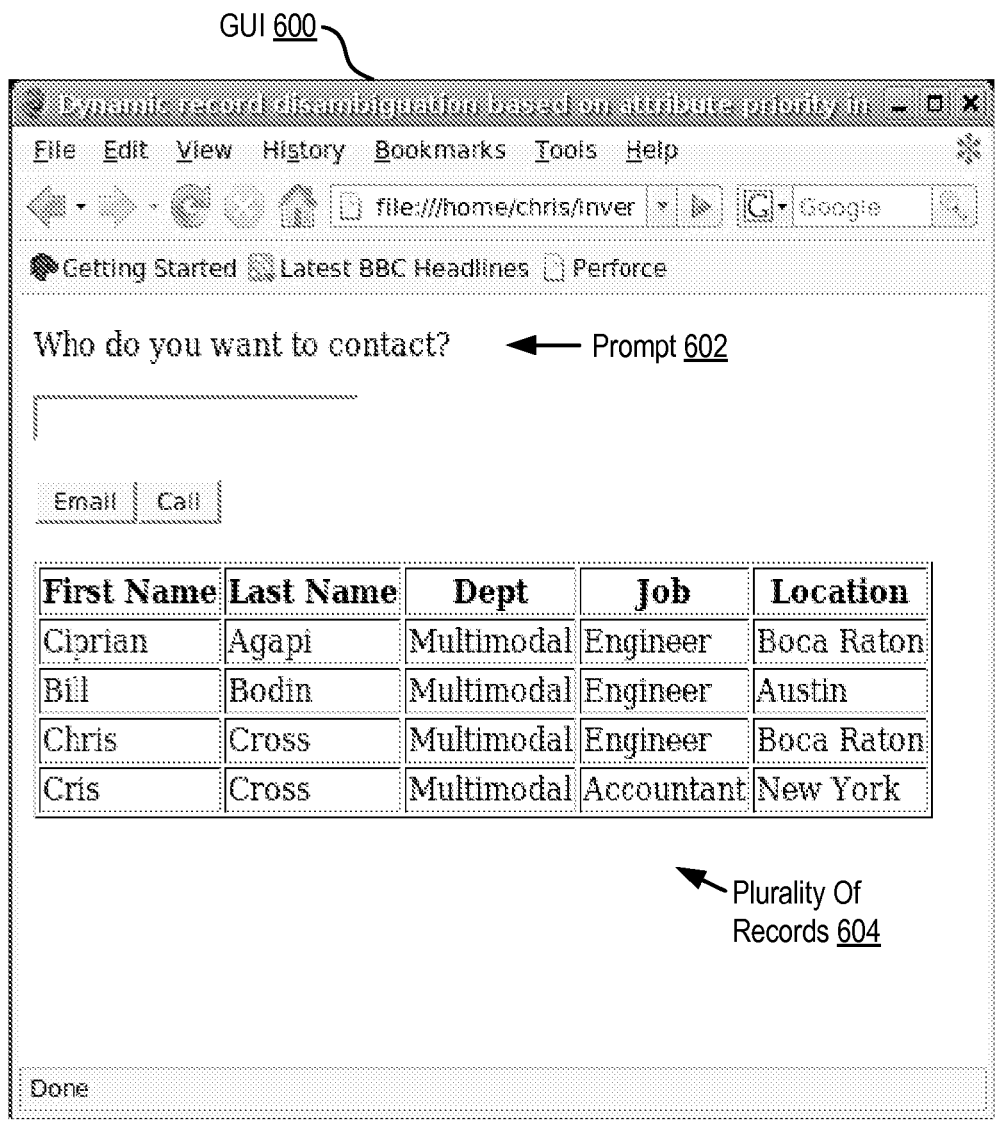
FIG. 6 sets forth a line drawing illustrating an exemplary GUI useful in prompting, by a multimodal application, a user to identify a particular record among a plurality of records according to embodiments of the present invention.

For further explanation, FIG. 6 sets forth a line drawing illustrating an exemplary GUI (600) useful in prompting, by a multimodal application, a user to identify a particular record among a plurality of records (604) according to embodiments of the present invention. The exemplary multimodal application of FIG. 6 is an application for contacting an individual in an employee directory. Each record in the plurality of records (604) represents the contact information for a single employee in the company. The GUI (600) of FIG. 6 renders a prompt (602) in an exemplary multimodal application that requests the user to identify an employee by the employee's name. The prompt (602) of FIG. 6 is implemented using the text "Who do you want to contact?" Because the exemplary application is a multimodal application, the multimodal application may play a speech representation of the prompt (602) through the multimodal device's speakers.

To generate the GUI (600) and prompt the user using a speech representation and a visual representation of the prompt (602) illustrated in FIG. 6, the multimodal application may include the following exemplary instructions implemented below using HTML and VoiceXML:

```
01:  <?xml version="1.0"?>
02:  <!DOCTYPE html PUBLIC "-//VoiceXML Forum//DTD
     XHTML+Voice
03:  1.2//EN"
04:  "http://www.voicexml.org/specs/multimodal/x+v/12/dtd/
     xhtml+voice12.dtd">
05:  <html xmlns="http://www.w3.org/1999/xhtml"
06:      xmlns:vxml="http://www.w3.org/2001/vxml"
07:      xmlns:ev="http://www.w3.org/2001/xml-events"
08:      xmlns:xv="http://www.voicexml.org/2002/xhtml+voice"
09:          xml:lang="en-US">
10:  <head>
11:      <title>Dynamic record disambiguation based on attribute priority
12:          in a multimodal browser.</title>
13:      ...
14:      <vxml:form id="vforml">
15:          <vxml:field name="contact">
16:              <vxml:prompt src="#pl"/>
17:              <vxml:grammar>
18:                  <![CDATA[
19:                      #JSGF V1.0;
20:                      grammar callee;
21:                      public <callee> = <method> {$choiceMethod =
22:                          $method} <name> {$choiceName =
23:                          $name;};
24:                      <method> = email|call|dial;
25:                      <name> = Ciprian { } | Bill { } |
26:                          Chris { $duplicate = true;};
27:                  ]]>
28:              </vxml:grammar>
29:              <vxml:filled>
30:                  <!-- If there is a duplicate create and run the dialog to
31:                  disambiguate -->
32:                  <vxml:if expr="duplicate == true">
33:                      <vxml:assign name="temp"
34:                          expr="createDisambiguateForm( )"/>
35:                      <vxml:goto next="#disambiguate"/>
36:                  <!-- Otherwise immediately contact the employee -->
37:                  <vxml:else/>
38:                      <vxml:assign name="temp"
39:                          expr="contactEmployee(choiceMethod,
40:                          choiceName)"/>
41:                  </vxml:if>
42:              </vxml:filled>
43:          </vxml:field>
44:      </vxml:form>
45:
46:      <vxml:form id="disambiguate" name="disambiguate">
47:          <!-- The body of this form is created at runtime by the
48:          function "createDisambiguateDialog"-->
49:      </vxml:form>
50:
51:  </head>
52:  <body ev:event="load" ev:handler="#vforml">
53:      <form action="">
54:          <p id="pl">Who do you want to contact?</p>
55:          <input type="text" id="query_name"/><br/>
56:          <input type="submit" value="Email"/><input
             type="submit"
57:              value="Call"/><br/><br/>
58:          <table border="1">
59:              <tr><th>First Name</th><th>Last Name</th><th>Dept</th>
60:              <th>Job</th><th>Location</th></tr>
61:              <tr><td>Ciprian</td><td>Agapi</td><td>Multimodal</td>
62:                  <td>Engineer</td><td>Boca Raton</td></tr>
63:              <tr><td>Bill</td><td>Bodin</td><td>Multimodal</td>
64:                  <td>Engineer</td><td>Austin</td></tr>
65:              <tr><td>Chris</td><td>Cross</td><td>Multimodal</td>
66:                  <td>Engineer</td><td>Boca Raton</td></tr>
67:              <tr><td>Cris</td><td>Cross</td><td>Multimodal</td>
68:                  <td>Accountant</td><td>New York</td></tr>
69:          </table>
70:      </form>
71:  </body>
72:  </html>
```

In the exemplary multimodal application above, an exemplary prompt is specified at line 54 in a HTML paragraph element '<p>.' Using the prompt at line 54, the multimodal application may display the text "Who do you want to contact?" on a GUI as illustrated in GUI (600) of FIG. 6. Concurrently, the multimodal application plays a speech representation of the prompt at line 54 through the speakers of the multimodal device. The multimodal application accomplishes this concurrent multimodal interaction by including the 'ev:event="load" ev:handler="#vforml"' parameters in the HTML <body> element at line 52, which instruct a multimodal browser to process the VoiceXML form 'vforml' at lines 14-44 when the HTML <body> element is processed. As the multimodal browser processes the HTML <body> element, the multimodal browser may pass the VoiceXML form 'vforml' to a VoiceXML interpreter for processing. The VoiceXML <prompt> element at line 16 instructs a VoiceXML interpreter to synthesize the prompt at line 54 and pass the synthesized speech back to the multimodal browser for playback through the speakers of the multimodal device as the HTML <body> element is rendered on the device's display. In such a manner, the exemplary multimodal application above prompts a user to identify a particular record among a plurality of records according to embodiments of the present invention. Readers will note, however, that the exemplary multimodal application above is for explanation only and not for limitation. The multimodal application may be implemented in a variety of ways as discussed above and as will occur to those of ordinary skill in the art.

Turning back to FIG. 5: the method of FIG. 5 also includes receiving (504), by the multimodal application (195) in response to the prompt (502), a voice utterance (506) from the user. The multimodal application (195) may receive (504) a voice utterance (506) from the user in response to the prompt (502) according to the method of FIG. 5 by recording a speech waveform through a microphone and digitizing and encoding the speech waveform for speech recognition using a codec implemented in the multimodal device.

Figure 7:
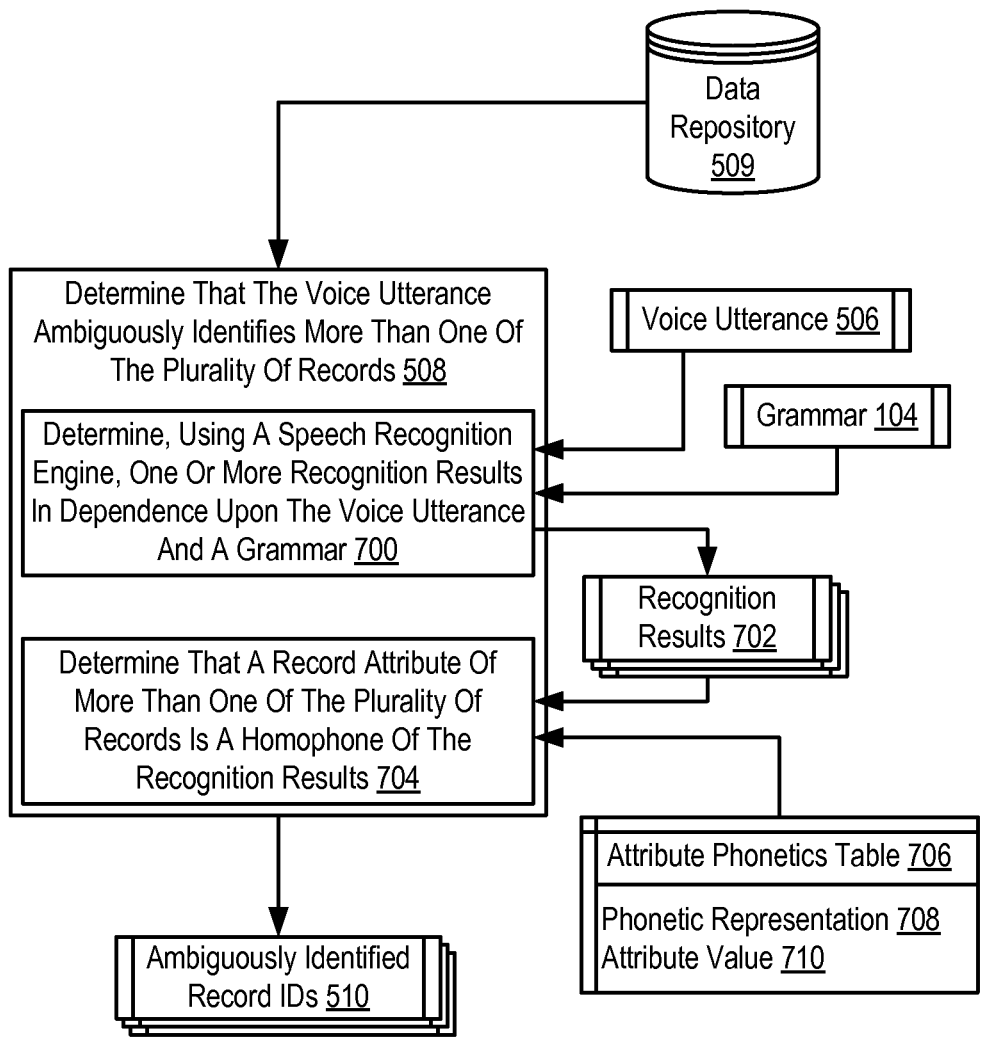
FIG. 7 sets forth a flow chart illustrating an exemplary method of determining, by a multimodal execution environment, that a voice utterance ambiguously identifies more than one of a plurality of records according to embodiments of the present invention.
Figure 8:
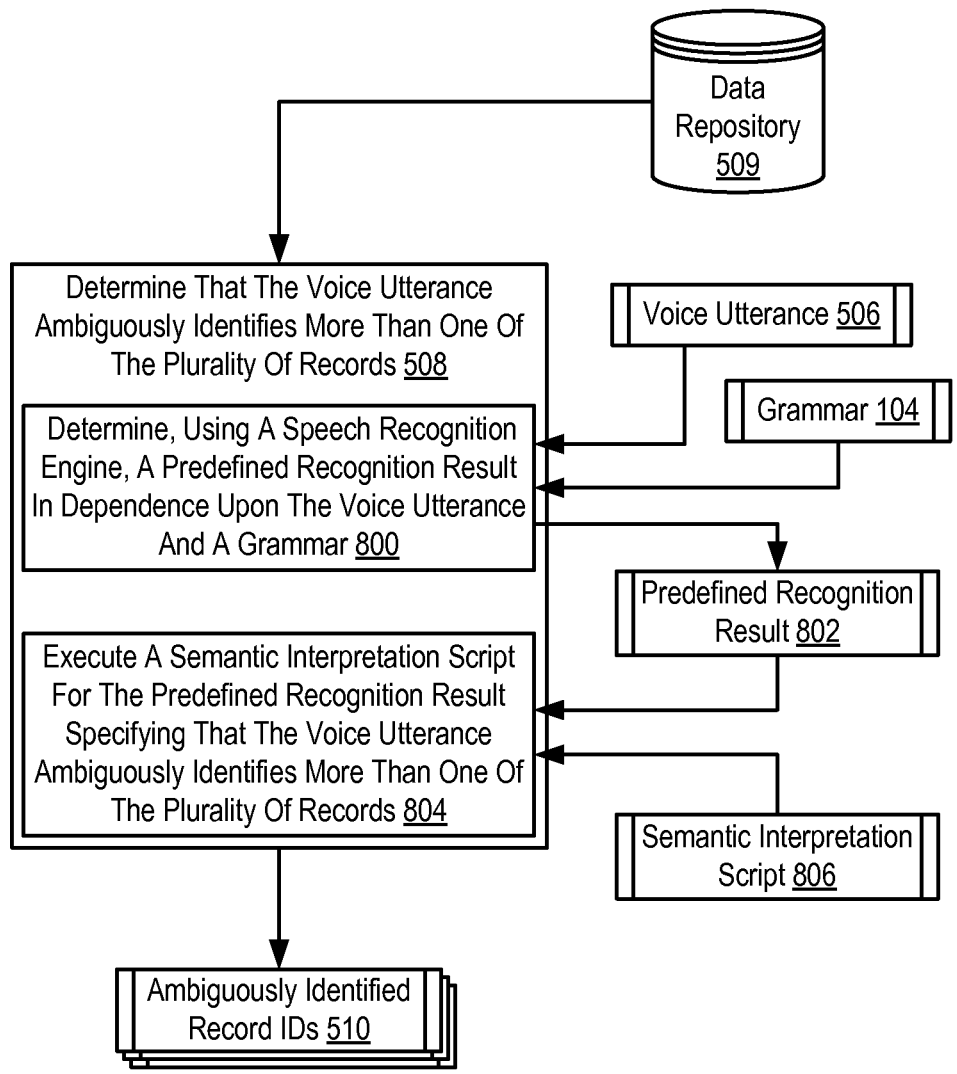
FIG. 8 sets forth a flow chart illustrating a further exemplary method of determining, by a multimodal execution environment, that a voice utterance ambiguously identifies more than one of a plurality of records according to embodiments of the present invention.

The method of FIG. 5 includes determining (508), by the multimodal application (195), that the voice utterance ambiguously identifies more than one of the plurality of records in a data repository (509). The data repository (509) may be implemented as a database, structured document, or any other data structure capable of storing records for processing the multimodal application (195). The data repository (509) may be installed on the multimodal device along with the multimodal application (195) or accessed remotely through a data communications network. Further explanation of determining that the voice utterance ambiguously identifies more than one of the plurality of records is described with reference to FIGS. 7 and 8. FIGS. 7 and 8 each set forth flow charts illustrating an exemplary method of determining that a voice utterance ambiguously identifies more than one of a plurality of records according to embodiments of the present invention.

In the method of FIG. 7, determining (508), by the multimodal application, that the voice utterance ambiguously identifies more than one of the plurality of records includes determining (700), using a speech recognition engine, one or more recognition results (702) in dependence upon the voice utterance (506) and a grammar (104). The multimodal application (195) may determine (700) one or more recognition results (702) using a speech engine in dependence upon the voice utterance (506) and a grammar (104) according to the method of FIG. 7 by passing the voice utterance (506) and the grammar (104) to the speech engine through a voice interpreter and receiving in response the recognition results (702) in an ECMAScript data structure such as, for example, the 'application.lastresult$' array. ECMAScript data structures represent objects in the Document Object Model ('DOM') at the scripting level in an X+V page. The DOM is created by a multimodal browser when the X+V page of the multimodal application is loaded. The 'application.lastresult$' array holds information about the last recognition generated by an ASR engine for the multimodal application. The 'application.lastresult$' is an array of elements where each element, application.lastresult$[i], represents a possible result through the following shadow variables:

- application.lastresult$[i].confidence, which specifies the confidence level for this recognition result. A value of 0.0 indicates minimum confidence, and a value of 1.0 indicates maximum confidence.
- application.lastresult$[i].utterance, which is the raw string of words that compose this recognition result. The exact tokenization and spelling is platform-specific (e.g. "five hundred thirty" or "5 hundred 30" or even "530").
- application.lastresult$[i].inputmode, which specifies the mode in which the user provided the voice utterance. Typically, the value is voice for a voice utterance.
- application.lastresult$[i].interpretation, which is an ECMAScript variable containing output from ECMAScript post-processing script typically used to reformat the value contained in the 'utterance' shadow variable.

When a voice interpreter stores the recognition results in an ECMAScript field variable array for a field specified in the multimodal application, the recognition results (506) may be stored in field variable array using shadow variables similar to the application variable 'application.lastresult$.' For example, a field variable array may represent a possible recognition result through the following shadow variables:

- name$[i].confidence,
- name$[i].utterance,
- name$[i].inputmode, and
- name$[i].interpretation, where 'name$' is a placeholder for the field identifier for a field in the multimodal application specified to store the results of the recognition results (702).

In the method of FIG. 7, determining (508), by the multimodal application, that the voice utterance ambiguously identifies more than one of the plurality of records also includes determining (704) that a record attribute of more than one of the plurality of records is a homophone of the recognition results (702). The multimodal application may determine (704) that a record attribute of more than one of the plurality of records is a homophone of the recognition results (702) according to the method of FIG. 7 by identifying the phonetic representation of the recognition results (702) and determining whether more than one record of the data repository (509) has an attribute with the same phonetic representation. The multimodal application may identify the phonetic representation of the recognition results (702) by retrieving the value of the 'utterance' shadow variable in the ECMAScript structure 'application.lastresult$' representing the recognition results (702).

In the method of FIG. 7, the multimodal application may determine whether more than one record of the data repository (509) has an attribute with the same phonetic representation by identifying whether more than one entry exists in an attribute's phonetics table (706) for the phonetic representation of the recognition results (702) used to identify records in the data repository (509) using that particular attribute. If more than one entry exists in an attribute phonetics table (706) for the phonetic representation of the recognition results (702), then more than one record of the data repository (509) has an attribute with the same phonetic representation. The records are indistinguishable based on the voice utterance (506). The multimodal application may record the identifiers (510) for these ambiguously identified records for later disambiguation. If more than one entry does not exist in an attribute phonetics table (706) for the phonetic representation of the recognition results (702), then more than one record of the data repository (509) does not have an attribute with the same phonetic representation, and the multimodal application is able to identify a single record based on the voice utterance (506).

The attribute phonetics table (706) of FIG. 7 is a data structure that associates record attribute values with the phonetic representations of those attribute values. Each record of the attribute phonetics table (706) associates a phonetic representation (708) of a record attribute value with a textual representation of the attribute value (710). For further explanation, consider an exemplary data repository having the following exemplary records:

TABLE 1

EXEMPLARY DATA REPOSITORY

| FIRST NAME | LAST NAME | DEPT | JOB | LOCATION |
| --- | --- | --- | --- | --- |
| Ciprian | Agapi | Multimodal | Engineer | Boca Raton |
| Bill | Bodin | Multimodal | Engineer | Austin |
| Chris | Cross | Multimodal | Engineer | Boca Raton |
| Cris | Cross | Multimodal | Accountant | New York |

Further consider the following exemplary attribute phonetics table for a first name attribute for the records of Table 1:

TABLE 2

EXEMPLARY ATTRIBUTE PHONETICS TABLE

| PHONETIC REPRESENTATION | ATTRIBUTE VALUE |
| --- | --- |
| B IY L L | Bill |
| K R IY S | Chris |
| IY P R IY AA N | Ciprian |
| K R IY S | Cris |

The exemplary phonetics table above associates the values for the first name attribute of the records in the exemplary data repository in Table 1 with the phonetic representations of the first names. Specifically, the exemplary phonetics table above specifies that two records in the exemplary data repository have first name attribute values having the same phonetic representation of 'K R IY S.' That is, two records of the data repository (509) specify first names that are homophones, namely 'Chris' and 'Cris.' Readers will note that the exemplary homophone table above is for explanation and not for limitation.

The attribute phonetics table (706) may be maintained by the database management system ('DBMS') that maintains the data repository (509). That is, as records are inserted and deleted from tables in the data repository (509), the DBMS may add and remove entries in an attribute phonetics table for each attribute of the records for the data repository (509). The DBMS may obtain the phonetics representations of the attributes from a larger table that may contain the phonetic representations for all of the words in a particular language.

As mentioned above, FIG. 8 also sets forth a flow chart illustrating an exemplary method of determining that a voice utterance ambiguously identifies more than one of a plurality of records according to embodiments of the present invention. In the method of FIG. 8, determining (508), by the multimodal application, that the voice utterance ambiguously identifies more than one of the plurality of records includes determining (800), using a speech recognition engine, a predefined recognition (802) result in dependence upon the voice utterance (506) and a grammar (104). The predefined recognition result (802) of FIG. 8 is a recognition result that represents an attribute for a record that is a homophone of the same attribute for some other record in the data repository (509). The multimodal application may determine (800) a predefined recognition (802) result using a speech recognition engine according to the method of FIG. 8 by passing the voice utterance (506) and the grammar (104) to the speech engine through a voice interpreter and receiving in response the recognition results (702) in an ECMAScript data structure such as, for example, the 'application.lastresult$' array.

In the example of FIG. 8, the grammar (104) may specify that the predefined recognition result (802) represents an attribute for a record that is a homophone of the same attribute for some other record using a semantic interpretation script (806). The semantic interpretation script (806) is a set of instructions embedded in the grammar (104) that are executed by voice interpreter based on the recognition results matched by the grammar (104). The semantic interpretation script (806) operates to transform the recognition result from the format matched by the ASR engine into a format more suitable for processing the multimodal application. The semantic interpretation script (806) may be embedded in the grammar (104) according to the Semantic Interpretation for Speech Recognition ('SISR') specification promulgated by the W3C or any other semantic interpretation specification as will occur to those of skill in the art.

For further explanation, consider again the exemplary data repository in Table 1 above having a plurality of records. Further consider the grammar from the exemplary multimodal application above and reproduced below:

```
17:    <vxml:grammar>
18:        <![CDATA[
19:            #JSGF V1.0;
20:            grammar callee;
21:            public <callee> = <method> {$choiceMethod =
22:                $method} <name> {$choiceName =
23:                $name;};
24:            <method> = email|call|dial;
25:            <name> = Ciprian { } | Bill { } |
26:                Chris { $duplicate = true;};
27:        ]]>
28:    </vxml:grammar>
```

The exemplary data repository of Table 1 includes records with first name attributes 'Chris' and 'Cris' that are homophones of one another. The exemplary grammar above specifies that a predefined recognition result 'Chris' represents an attribute for a record that is a homophone of the same attribute for some other record using a semantic interpretation script '$duplicate=true.' By attaching the semantic interpretation script to the grammar element 'Chris,' the grammar informs the multimodal application that the voice utterance supplied by a user may in fact represent a predefined recognition result 'Chris' or a homophone of the predefined recognition result 'Chris,' such as 'Cris.'

In the method of FIG. 8, determining (508), by the multimodal application, that the voice utterance ambiguously identifies more than one of the plurality of records includes executing (804) a semantic interpretation script (806) for the predefined recognition result (802) specifying that the voice utterance ambiguously identifies more than one of the plurality of records. The multimodal application may execute (804) the semantic interpretation script (806) according to the method of FIG. 8 by passing the grammar (104), which includes the semantic interpretation script (806) to a voice interpreter along with the voice utterance (506). The voice interpreter in turn processes the semantic interpretation script when the speech engine matches the predefined recognition result (802). Continuing with the exemplary grammar above, the voice interpreter executes the semantic interpretation script '$duplicate=true' when the speech engine returns the predefined recognition result 'Chris.' Because the multimodal application uses the ECMAScript variable '$duplicate' to indicate whether the values for same attribute of at least two records are homophones, executing the semantic interpretation script '$duplicate=true' instructs that the multimodal application that the values for same attribute of at least two records are homophones. Therefore, the voice utterance used to determine the predefined recognition result 'Chris' ambiguously identifies more than one record. The multimodal application may then record the identifiers (510) for these ambiguously identified records for later disambiguation.

Turning back to FIG. 5: the method of FIG. 5 includes generating (512), by the multimodal application (195), a user interaction (514) to disambiguate the records ambiguously identified by the voice utterance (506) in dependence upon record attributes of the records ambiguously identified by the voice utterance (506). The multimodal application (195) may generate (512) a user interaction (514) to disambiguate the records ambiguously identified by the voice utterance (506) according to the method of FIG. 5 by executing an ECMAScript to create a VoiceXML form. In such a manner, the user interaction (514) is implemented with a VoiceXML form. For example, consider again the exemplary multimodal application listed above. The exemplary multimodal application executes an ECMAScript function 'createDisambiguateForm( )' at lines 33-34 to create the content of the 'disambiguate' VoiceXML form listed in the exemplary multimodal application above at lines 46-49.

Figure 9:
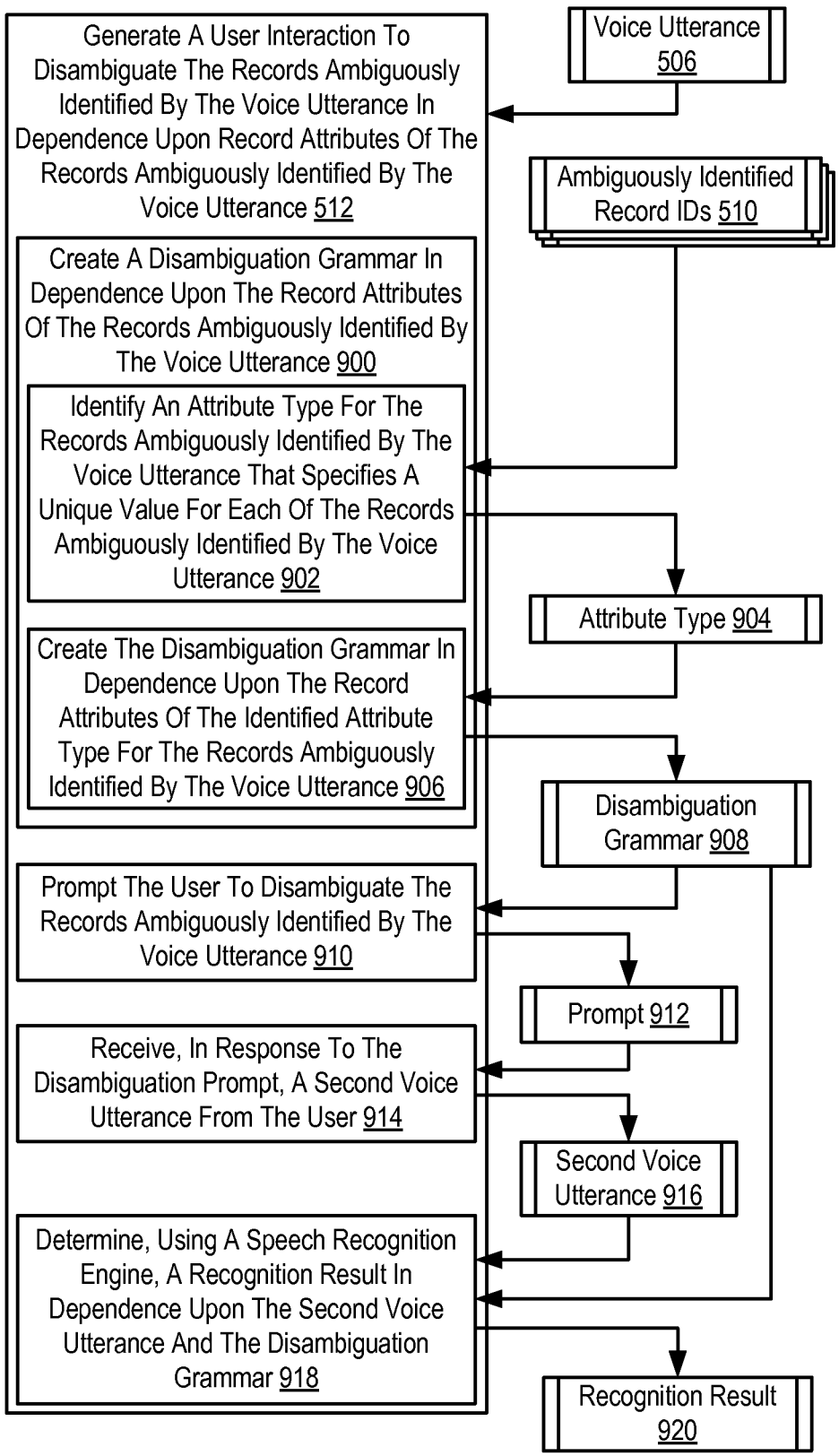
FIG. 9 sets forth a flow chart illustrating an exemplary method of generating, by a multimodal execution environment, a user interaction to disambiguate records ambiguously identified by a voice utterance in dependence upon record attributes of the records ambiguously identified by the voice utterance according to embodiments of the present invention.

For further explanation, FIG. 9 sets forth a flow chart illustrating an exemplary method of generating (512), by the multimodal application (195), a user interaction (514) to disambiguate the records ambiguously identified by the voice utterance (506) in dependence upon record attributes of the records ambiguously identified by the voice utterance (506) according to embodiments of the present invention. The multimodal application (195) generates (512) a user interaction (514) to disambiguate the ambiguously identified records according to the method of FIG. 9 by creating (900) a disambiguation grammar (908) in dependence upon the record attributes of the records ambiguously identified by the voice utterance (506). The disambiguation grammar (908) of FIG. 9 is a grammar that aids the speech engine in recognizing spoken attribute values for a particular attribute of the records ambiguously identified by the voice utterance (506)—that is, the records having identifiers (510).

Creating (900) a disambiguation grammar (908) according to the method of FIG. 9 includes identifying (902) an attribute type (904) for the records ambiguously identified by the voice utterance that specifies a unique value for each of the records ambiguously identified by the voice utterance. The multimodal application may identify (902) an attribute type (904) for the ambiguously identified records according to the method of FIG. 9 by traversing through each type of attribute for the records having identifiers (510) until an attribute type is located that has different values for each record identified by identifiers (510). The order in which the attribute types are traversed may be determined by the physical layout of the records in the storage medium, by priority values associated with each attribute type, and so on. For example, consider again the exemplary data repository above having four exemplary records and the user provided a voice utterance that specified the homophonic set 'Chris' and 'Cris.' The ambiguously identified record identifiers for such an example specify the following records:

TABLE 3

EXEMPLARY AMBIGUOUSLY IDENTIFIED RECORDS

| FIRST NAME | LAST NAME | DEPT | JOB | LOCATION |
|---|---|---|---|---|
| Chris | Cross | Multimodal | Engineer | Boca Raton |
| Cris | Cross | Multimodal | Accountant | New York |

Further consider that the multimodal application creates a disambiguation grammar (908) giving first priority to the 'last name' attribute for each ambiguously identified record and second priority to 'job' attribute for each ambiguously identified record. When the multimodal application traverses the 'last name' attribute for the records above, the multimodal application determines that none of the 'last name' attributes have different values. The multimodal application then traverses the 'job' attribute for each ambiguously identified record above and determines that the 'job' attribute for each record contains different values—namely 'Engineer' and 'Accountant.' Accordingly, the multimodal application identifies the 'job' attribute as an attribute type that specifies a unique value for each of the ambiguously identified records. Readers will note that the exemplary ambiguously identified records and identified attribute type above are for explanation only and not for limitation.

Creating (900) a disambiguation grammar (908) according to the method of FIG. 9 also includes creating (906) the disambiguation grammar (908) in dependence upon the record attributes of the identified attribute type (904) for the records ambiguously identified by the voice utterance. The multimodal application may create (906) the disambiguation grammar (908) in dependence upon the record attributes of the identified attribute type (904) according to the method of FIG. 9 by invoking an ECMAScript that parses the attribute values of the attribute type for the ambiguously identified records specified by identifiers (510) and inserts the parsed values in a grammar template, which in turn is inserted into a VoiceXML form template. For example, consider the following exemplary ECMAScript that may be included in the header of the exemplary multimodal application described above:

```
01:    <script type="text/javascript">
02:    <![CDATA[
03:            var duplicate = false;
04:            var choiceMethod;
05:            var choiceName;
06:            var choiceAttribute;
07:            var choiceAttributeType;
08:
09:            // Set of employee records. While shown statically the variable could
10:            // also be created by an AJAX call to the application server. Not shown
11:            // include Email Address, Phone Number, etc First Last Department
12:            // Job Location
13:            var employees = {{"Ciprian", "Agapi", "Multimodal", "Engineer",
14:                    "Boca Raton"}, {"Bill", "Bodin", "Multimodal", "Engineer",
15:                    "Austin"}, {"Chris", "Cross", "Multimodal", "Engineer", "Boca
16:                    Raton"}, {"Cris", "Cross", "Multimodal", "Accountant", "New
17:                    York"}};
18:
19:            function contactEmployee(method, name) {
20:            // This function uses the chosen method to contact the employee
21:            }
22:
23:            contactEmployee(method, name, attributeType) {
24:            // This function looks up the employee by name, attribute, and attribute
25:            // type and then uses the chosen method to contact the employee.
26:            }
27:
28:            function createVxmlFormContent(jobGrammar, locationGrammar) {
29:            // This function generates the content for the "disambiguate" form
30:            // given grammars for job and location attributes generated from the
31:            // homophone sets.
32:            }
33:
34:            function createFormTxt( ) {
35:            // The user's choice was the last recognition result
36:            choiceName = application$.lastresult;
37:            // Get the records that have the same name as the user's choice
38:            var duplicates = findDuplicatesByName(choiceName);
39:            // Construct grammar for the job attribute
40:            var jobGrammar = "<job> = ";
41:            for (empl in employees)
42:                    jobGrammar += empl[4] + "|";
43:            // Replace the final | with ; and append the SI script
```

```
44:            jobGrammar[jobGrammar.Length( ) −1] = ';';
45:            jobGrammar += "{$type = 'job'}";
46:     // Construct vxml form using the grammars
47:     var dlg = createVxmlFormContent(jobGrammar, locationGrammar);
48:     return dlg;
49:     }
50:
51:     function createDisambiguateForm( ) {
52:            var vform = getElementById("disambiguate");
53:            vform.innerVoiceXML = createFormTxt( );
54:            duplicate = false;
55:     }
56: ]]>
57: </script>
```

Readers will recall from above that the exemplary multimodal application listed above invokes the 'createDisambiguateForm' function when a user initially provides a voice utterance (506) that ambiguously specifies 'Chris' or 'Cris.' The 'createDisambiguateForm' function at line 53 of the exemplary ECMAScript above invokes the 'createFormTxt' function at lines 34-49 that generates the text for the VoiceXML form 'disambiguate' at lines 46-49 of the exemplary multimodal application above. The 'createFormTxt' function parses the attribute values of the attribute type 'job' for the ambiguously identified records specified by identifiers (510) and inserts the parsed values in a grammar template, which in turn is inserted into a VoiceXML form template specified by the 'createVxmlFormContent' function.

An exemplary 'disambiguate' VoiceXML form that results from the ECMAScript above may include the following exemplary VoiceXML form:

```
01:  <vxml:form id="disambiguate" name="disambiguate">
02:     <vxml:field name="choice">
03:         <vxml:prompt count="1">
04:             There are two employees with the name Chris listed.
05:             Do you want the one who is an Engineer or
06:             Accountant?
07:         </vxml:prompt>
08:         <vxml:grammar>
09:         <![CDATA[
10:             #JSGF V1.0;
11:             grammar choice;
12:             public <job> = Engineer | Accountant
13:                 {$choiceAttributeType = 'job'};
14:         ]]>
15:         </vxml:grammar>
16:         <vxml:filled>
17:             <vxml:assign name="temp" expr="contactEmployee(
18:                 choiceName, choiceAttributeType)"/>
19:         </vxml:filled>
20:     </vxml:field>
21:  </vxml:form>
```

The method of FIG. 9 continues as the multimodal application (195) generates (512) a user interaction (514) to disambiguate the ambiguously identified records according to the method of FIG. 9 by prompting (912) the user to disambiguate the records ambiguously identified by the voice utterance (506). The multimodal application may prompt the user to disambiguate the ambiguously identified records according to the method of FIG. 9 by rendering a VoiceXML <prompt> element such as, for example, the following exemplary VoiceXML <prompt> element from the exemplary 'disambiguate' VoiceXML form above:

```
03:     <vxml:prompt count="1">
04:         There are two employees with the name Chris listed.
05:         Do you want the one who is an Engineer or
06:         Accountant?
07:     </vxml:prompt>
```

The multimodal application may pass the exemplary VoiceXML <prompt> element above to a voice interpreter, which in turn passes the prompt to a speech engine that generates a synthesized speech representation of the prompt. The speech engine then returns the synthesized speech to the multimodal application, and the multimodal application plays the synthesized speech to the user through the multimodal device's speakers, which prompts the user to provide a response. Readers will note that the exemplary prompt above is for explanation only and not for limitation.

The multimodal application (195) also generates (512) a user interaction (514) to disambiguate the ambiguously identified records according to the method of FIG. 9 by receiving (914), in response to the disambiguation prompt (912), a second voice utterance (916) from the user. The multimodal application may receive (914) a second voice utterance (916) from the user according to the method of FIG. 9 by recording a speech waveform through a microphone and digitizing and encoding the speech waveform for speech recognition using a codec implemented in the multimodal device.

The multimodal application (195) further generates (512) a user interaction (514) to disambiguate the ambiguously identified records according to the method of FIG. 9 by determining (918), using a speech recognition engine, a recognition result (920) in dependence upon the second voice utterance (916) and the disambiguation grammar (908). The multimodal application may determine (918) a recognition result (920) in dependence upon the second voice utterance (916) and the disambiguation grammar (908) according to the method of FIG. 9 by passing the second voice utterance (916) and the disambiguation grammar (908) to the speech engine through a voice interpreter and receiving in response the recognition results (920) in an ECMAScript data structure such as, for example, the 'application.lastresult$' array.

Turning back to FIG. 5: the method of FIG. 5 includes selecting (516), by the multimodal application (195) for further processing, one of the records ambiguously identified by the voice utterance (506) in dependence upon the user interaction (514). As described with reference to FIG. 9, the user interaction (514) yields a recognition result (920) from a second voice utterance (916). The multimodal application (195) may select (516), for further processing, one of the records ambiguously identified by the voice utterance (506) according to the method of FIG. 5 by identifying one of the records ambiguously identified by the voice utterance in dependence upon the recognition result (920) determined from the second voice utterance (916) received during the user interaction (514). The multimodal application may identify one of the ambiguously identified records specified using identifiers (510) by traversing each of these records for a record having an attribute value that matches the recognition results (920) from the second utterance (916) and recording the identifier (518) for the record having an attribute value that matches the recognition results (920) from the second utterance (916). The multimodal application may then reference the record using the record identifier (518) to access the record for further processes such as, for example, displaying the record information, sending an email based on the record information, performing a financial transaction based on the record information, and so on.

Exemplary embodiments of the present invention are described largely in the context of a fully functional computer system for record disambiguation in a multimodal application operating on a multimodal device. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of record disambiguation in a voice- and text-supported application operating on a voice- and text-supported device, the method comprising:
   receiving, by the voice- and text-supported application, a voice input from a user;
   determining, by the voice- and text-supported application, that the voice input matches record attribute values of at least one particular record attribute type for multiple records of a plurality of records and thereby ambiguously identifies more than one of the plurality of records, the multiple records of the plurality of records that match the voice input comprising a matching set of records;
   generating, by the voice- and text-supported application, a user interaction to disambiguate the multiple records in the matching set by identifying at least one additional record attribute type of the plurality of records in the matching set for which each record of the plurality of records in the matching set has a different record attribute value;
   prompting the user, based on the identified at least one additional record attribute type, by:
      outputting, via voice output, a name of the identified at least one additional record attribute type to the user in the user interaction, and
      outputting, for each record of the plurality of records in the matching set, a record attribute value of the record for the identified at least one additional record attribute type to the user in the user interaction; and
   selecting, by the voice- and text-supported application for further processing, one of the multiple records ambiguously identified by the voice input in dependence upon the user interaction.

2. The method of claim 1, wherein determining, by the voice- and text-supported application, that the voice input ambiguously identifies more than one of the plurality of records further comprises:
   determining, using a speech recognition engine, one or more recognition results in dependence upon the voice input and a grammar; and
   determining that the one or more recognition results match a first record attribute value of a first record of the plurality of records and a second record attribute value of a second record of the plurality of records, wherein the first record attribute value and the second record attribute value comprise at least one homophonic set of different words that have a same pronunciation.

3. The method of claim 1, wherein determining, by the voice- and text-supported application, that the voice input ambiguously identifies more than one of the plurality of records further comprises:
   determining, using a speech recognition engine, a predefined recognition result in dependence upon the voice input and a grammar; and
   executing a semantic interpretation script for the predefined recognition result specifying that the voice input ambiguously identifies more than one of the plurality of records.

4. The method of claim 1, wherein generating, by the voice- and text-supported application, a user interaction to disambiguate the multiple records in the matching set further comprises executing an ECMAScript to create a VoiceXML form.

5. The method of claim 1, wherein generating, by the voice- and text-supported application, a user interaction to disambiguate the multiple records in the matching set further comprises:
   creating a disambiguation grammar in dependence upon record attribute values of the multiple records in the matching set;
   prompting the user to disambiguate the multiple records in the matching set;
   receiving, in response to prompting the user, a second voice input from the user; and
   determining, using a speech recognition engine, a recognition result in dependence upon the second voice input and the disambiguation grammar,
   wherein selecting, by the voice- and text-supported application for further processing, one of the multiple records ambiguously identified by the voice input in dependence upon the user interaction further comprises identifying one of the multiple records ambiguously identified by the voice input in dependence upon the recognition result.

6. The method of claim 5, wherein creating a disambiguation grammar in dependence upon the record attribute values of the multiple records in the matching set comprises:
  identifying a record attribute type of the plurality of records in the matching set that specifies a unique value for each record of the plurality of records in the matching set; and
  creating the disambiguation grammar in dependence upon the identified record attribute type.

7. A voice- and text-supported device comprising:
  a computer processor and a computer memory operatively coupled to the computer processor, the computer memory having disposed within it computer program instructions that, when executed by the computer processor, perform acts of:
    receiving, by a voice- and text-supported application operating on the voice- and text-supported device, a voice input from a user;
    determining, by the voice- and text-supported application, that the voice input matches record attribute values of at least one particular record attribute type for multiple records of a plurality of records and thereby ambiguously identifies more than one of the plurality of records, the multiple records of the plurality of records that match the voice input comprising a matching set of records;
    generating, by the voice- and text-supported application, a user interaction to disambiguate the multiple records in the matching set by identifying at least one additional record attribute type of the plurality of records in the matching set for which each record of the plurality of records in the matching set has a different record attribute value;
    prompting the user, based on the identified at least one additional record attribute type, by:
      outputting, via voice output, a name of the identified at least one additional record attribute type to the user in the user interaction, and
      outputting, for each record of the plurality of records in the matching set, a record attribute value of the record for the of the identified at least one additional record attribute type to the user in the user interaction; and
    selecting, by the voice- and text-supported application for further processing, one of the multiple records ambiguously identified by the voice input in dependence upon the user interaction.

8. The voice- and text-supported device of claim 7, wherein determining, by the voice- and text-supported application, that the voice input ambiguously identifies more than one of the plurality of records further comprises:
  determining, using a speech recognition engine, one or more recognition results in dependence upon the voice input and a grammar; and
  determining that a record attribute value of more than one of the plurality of records is a homophone of the one or more recognition results.

9. The voice- and text-supported device of claim 7, wherein determining, by the voice- and text-supported application, that the voice input ambiguously identifies more than one of the plurality of records further comprises:
  determining, using a speech recognition engine, a predefined recognition result in dependence upon the voice input and a grammar; and
  executing a semantic interpretation script for the predefined recognition result specifying that the voice input ambiguously identifies more than one of the plurality of records.

10. The voice- and text-supported device of claim 7, wherein generating, by the voice- and text-supported application, a user interaction to disambiguate the multiple records in the matching set further comprises executing an ECMAScript to create a VoiceXML form.

11. The voice- and text-supported device of claim 7, wherein generating, by the voice- and text-supported application, a user interaction to disambiguate the multiple records in the matching set further comprises:
  creating a disambiguation grammar in dependence upon record attribute values of the multiple records in the matching set;
  prompting the user to disambiguate the multiple records in the matching set;
  receiving, in response to prompting the user, a second voice input from the user; and
  determining, using a speech recognition engine, a recognition result in dependence upon the second voice input and the disambiguation grammar,
  wherein selecting, by the voice- and text-supported application for further processing, one of the multiple records ambiguously identified by the voice input in dependence upon the user interaction further comprises identifying one of the multiple records ambiguously identified by the voice input in dependence upon the recognition result.

12. The voice- and text-supported device of claim 11, wherein creating a disambiguation grammar in dependence upon the record attribute values of the multiple records in the matching set comprises:
  identifying a record attribute type of the plurality of records in the matching set that specifies a unique value for each record of the plurality of records in the matching set; and
  creating the disambiguation grammar in dependence upon the identified record attribute type.

13. The voice- and text-supported device of claim 7, wherein identifying the at least one additional record attribute type of the plurality of records in the matching set comprises traversing each record attribute type of a plurality of record attribute types of the plurality of records in the matching set in an order determined by at least one priority value associated with each record attribute type of the plurality of record attribute types.

14. The voice- and text-supported device of claim 7, wherein outputting the identified at least one additional record attribute type to the user in the user interaction comprises outputting names of a plurality of identified additional record attribute types to the user in the user interaction.

15. At least one non-transitory recordable medium having disposed thereon a computer program product for use with a voice- and text-supported application operating on a voice- and text-supported device, the computer program product disposed upon a computer readable medium, the computer program product comprising computer program instructions that, when executed, perform acts of:
  receiving, by the voice- and text-supported application, a voice input from a user;
  determining, by the voice- and text-supported application, that the voice input matches record attribute values of at least one particular record attribute type for multiple records of a plurality of records and thereby ambiguously identifies more than one of the plurality of records, the multiple records of the plurality of records that match the voice input comprising a matching set of records;
  generating, by the voice- and text-supported application, a user interaction to disambiguate the multiple records in the matching set by identifying at least one additional attribute type of the plurality of records in the matching set for which each record of the plurality of records in the matching set has a different record attribute value;

prompting the user, based on the identified at least one additional record attribute type, by:
outputting, via voice output, a name of the identified at least one additional record attribute type to the user in the user interaction, and
outputting, for each record of the plurality of records in the matching set, a record attribute value of the record for the identified at least one additional record attribute type to the user in the user interaction; and selecting, by the voice- and text-supported application for further processing, one of the multiple records ambiguously identified by the voice input in dependence upon the user interaction.

16. The at least one non-transitory recordable medium of claim 15, wherein determining, by the voice- and text-supported application, that the voice input ambiguously identifies more than one of the plurality of records further comprises:
determining, using a speech recognition engine, one or more recognition results in dependence upon the voice input and a grammar; and
determining that a record attribute value of more than one of the plurality of records is a homophone of the one or more recognition results.

17. The at least one non-transitory recordable medium of claim 15, wherein determining, by the voice- and text-supported application, that the voice input ambiguously identifies more than one of the plurality of records further comprises:
determining, using a speech recognition engine, a predefined recognition result in dependence upon the voice input and a grammar; and
executing a semantic interpretation script for the predefined recognition result specifying that the voice input ambiguously identifies more than one of the plurality of records.

18. The at least one non-transitory recordable medium of claim 15, wherein generating, by the voice- and text-supported application, a user interaction to disambiguate the multiple records in the matching set further comprises executing an ECMAScript to create a VoiceXML form.

19. The at least one non-transitory recordable medium of claim 15, wherein generating, by the voice- and text-supported application, a user interaction to disambiguate the multiple records in the matching set further comprises:
creating a disambiguation grammar in dependence upon record attribute values of the multiple records in the matching set;
prompting the user to disambiguate the multiple records in the matching set;
receiving, in response to prompting the user, a second voice input from the user; and
determining, using a speech recognition engine, a recognition result in dependence upon the second voice input and the disambiguation grammar,
wherein selecting, by the voice- and text-supported application for further processing, one of the multiple records ambiguously identified by the voice input in dependence upon the user interaction further comprises identifying one of the multiple records ambiguously identified by the voice input in dependence upon the recognition result.

20. The at least one non-transitory recordable medium of claim 19, wherein creating a disambiguation grammar in dependence upon the record attribute values of the multiple records in the matching set comprises:
identifying a record attribute type of the plurality of records in the matching set that specifies a unique value for each record of the plurality of records in the matching set; and
creating the disambiguation grammar in dependence upon the identified record attribute type.

\* \* \* \* \*